US008014470B2

(12) United States Patent
Lee et al.

(10) Patent No.: US 8,014,470 B2
(45) Date of Patent: Sep. 6, 2011

(54) DECODING METHOD FOR ALAMOUTI SCHEME WITH HARQ AND/OR REPETITION CODING

(75) Inventors: Jungwon Lee, Cupertino, CA (US); Woong Jun Jang, Stanford, CA (US)

(73) Assignee: Marvell World Trade Ltd., St. Michael (BB)

( * ) Notice: Subject to any disclaimer, the term of this patent is extended or adjusted under 35 U.S.C. 154(b) by 783 days.

(21) Appl. No.: 11/854,219

(22) Filed: Sep. 12, 2007

(65) Prior Publication Data

US 2008/0063103 A1 Mar. 13, 2008

Related U.S. Application Data

(60) Provisional application No. 60/825,443, filed on Sep. 13, 2006, provisional application No. 60/949,160, filed on Jul. 11, 2007.

(51) Int. Cl.
*H04L 27/06* (2006.01)
*H04B 1/10* (2006.01)
*H04B 15/00* (2006.01)

(52) U.S. Cl. ......................... 375/340; 375/347; 455/137

(58) Field of Classification Search .................. 375/260, 375/262, 265, 267, 295, 299–300, 316, 347, 375/324, 340–341, 346; 455/101, 562.1, 455/132, 137

See application file for complete search history.

(56) References Cited

U.S. PATENT DOCUMENTS

| | | | |
|---|---|---|---|
| 6,185,258 B1 * | 2/2001 | Alamouti et al. | ............. 375/260 |
| 6,567,388 B1 | 5/2003 | Tomcik et al. | |
| 6,687,492 B1 | 2/2004 | Sugar et al. | |
| 6,778,619 B2 | 8/2004 | Zangi et al. | |
| 6,868,520 B1 | 3/2005 | Fauconnier | |
| 6,967,598 B2 | 11/2005 | Mills | |
| 7,194,237 B2 | 3/2007 | Sugar et al. | |
| 7,295,624 B2 * | 11/2007 | Onggosanusi et al. | ....... 375/267 |
| 7,362,815 B2 | 4/2008 | Lindskog et al. | |
| 7,382,841 B2 | 6/2008 | Ohtaki et al. | |
| 7,428,269 B2 | 9/2008 | Sampath | |

(Continued)

FOREIGN PATENT DOCUMENTS

EP  1271835  1/2003

(Continued)

OTHER PUBLICATIONS

Alkhansari et al., Constelation Space Invariance of Space-Time Block Codes With Application to Optimal Antenna Subset Selection, 2003, Signal Processing Advances in Wireless Communications, 2003. SPAWC 2003. 4th IEEE Workshop on, pp. 269-273.*

(Continued)

*Primary Examiner* — Tesfaldet Bocure
*Assistant Examiner* — Lawrence B Williams

(57) ABSTRACT

Systems and methods are provided for decoding a signal vector in a transmission scheme that uses transmit diversity as well as HARQ, repetition coding, or any other protocol that allows a receiver to obtain multiple reception of common transmit information. Information obtained in more than one symbol period are treated as a single received vector, and each of the received signal vectors may be processed to reduce or remove phase rotations caused by the channel. The received signal vectors may be combined by addition and decoded using a maximum-likelihood decoder. In some embodiments, the transmitter and receiver are configured to communicate using the transmit diversity scheme and a spatial multiplexing scheme. The scheme may be chosen based on the quality of the channel through which communication takes place.

81 Claims, 21 Drawing Sheets

U.S. PATENT DOCUMENTS

| | | | |
|---|---|---|---|
| 7,489,746 | B1 | 2/2009 | Awater et al. |
| 7,502,432 | B2 | 3/2009 | Catreux et al. |
| 7,526,038 | B2 * | 4/2009 | McNamara ................ 375/267 |
| 7,539,274 | B2 | 5/2009 | Catreux et al. |
| 7,548,592 | B2 | 6/2009 | Wight |
| 7,573,806 | B2 | 8/2009 | Ihm et al. |
| 7,590,204 | B2 | 9/2009 | Monsen |
| 7,593,489 | B2 | 9/2009 | Koshy et al. |
| 7,649,953 | B2 | 1/2010 | Bauch |
| 7,742,550 | B2 | 6/2010 | Olesen et al. |
| 7,885,364 | B2 | 2/2011 | Ito |
| 2003/0012318 | A1 | 1/2003 | Piirainen |
| 2004/0049725 | A1 | 3/2004 | Golitschek et al. |
| 2004/0077378 | A1 * | 4/2004 | Kim et al. ................ 455/562.1 |
| 2004/0181419 | A1 | 9/2004 | Davis et al. |
| 2005/0117520 | A1 | 6/2005 | Miyoshi |
| 2005/0141644 | A1 | 6/2005 | Sadowsky |
| 2006/0039299 | A1 | 2/2006 | Ihm et al. |
| 2006/0107167 | A1 | 5/2006 | Jeong et al. |
| 2006/0245476 | A1 * | 11/2006 | Wang et al. ................ 375/148 |
| 2006/0251156 | A1 | 11/2006 | Grant et al. |
| 2006/0274836 | A1 | 12/2006 | Sampath et al. |
| 2007/0127603 | A1 | 6/2007 | Niu et al. |
| 2007/0268988 | A1 | 11/2007 | Hedayat et al. |
| 2008/0025427 | A1 * | 1/2008 | Lee et al. ................ 375/262 |
| 2008/0025429 | A1 * | 1/2008 | Lee et al. ................ 375/267 |
| 2008/0025443 | A1 * | 1/2008 | Lee et al. ................ 375/347 |
| 2008/0037670 | A1 * | 2/2008 | Lee et al. ................ 375/260 |
| 2008/0063103 | A1 | 3/2008 | Lee et al. |
| 2008/0144733 | A1 | 6/2008 | ElGamal et al. |
| 2008/0198941 | A1 * | 8/2008 | Song et al. ................ 375/260 |
| 2009/0031183 | A1 | 1/2009 | Hoshino et al. |
| 2009/0063106 | A1 | 3/2009 | Burg et al. |
| 2009/0080579 | A1 * | 3/2009 | Fujii ................ 375/347 |
| 2009/0252236 | A1 | 10/2009 | Li et al. |
| 2009/0307558 | A1 | 12/2009 | Lee et al. |
| 2010/0014601 | A1 * | 1/2010 | Mo et al. ................ 375/260 |

FOREIGN PATENT DOCUMENTS

| | | |
|---|---|---|
| EP | 1 501 210 | 1/2005 |
| EP | 1 608 081 | 12/2005 |
| WO | WO 00/52873 | 9/2000 |
| WO | WO 02/067491 | 8/2002 |

OTHER PUBLICATIONS

Panagiotis et al., Frobenius Norm Based Receive Antenna Subarray Formation for MIMO Systems, 2006, First European Conference on Antennas and Propagation, 2006, pp. 1-5.*

Samra et al., Sphere Decoding for Retransmission Diversity in MIMO Flat-Fading Channels, 2004, IEEE International Conference Proceedings on Acoustics, Speech and Signal Processing, vol. 4, pp. iv-585-iv-588.*

Acolatse et al., An Alamouti-based Hybrid-ARQ Scheme for MIMO Systems, Oct. 1998, IEEE Journal on Select. Areas Communications, vol. 16, pp. 1451-1458.*

Jang et al., An Efficient Symbol-Level Combining Schme for MIMO Systems With Hybrid ARQ, May 26, 2009, IEEE Transactions on Wireless Communications, vol. 8, pp. 2443-2451.*

Acolatse, Kodzovi et al. "An Alamouti-based Hybrid-ARQ Scheme for MIMO Systems" 14th IST Mobile and Wireless Communications, Dresden (Jun. 2005).

Acolatse, Kodzovi et al. "Space Time Block Coding HARQ scheme for Highly Frequency Selective Channels" 2007 IEEE International Conference on Communications, pp. 4416-4420 (Jun. 24, 2007).

Chiang, Ping-Hung et al. "Performance of 2IMO Differentially Transmit-Diversity Block Coded OFDM Systems in Doubly Selective Channels" Global Telecommunications Conference, 2005, pp. 3768-3773 (Nov. 11, 2005).

Kim, Woo Tai et al. Performance of STBC with Turbo Code in HARQ Scheme for Mobile Communication System. Telecommunications, 2003. ICT 2003. 10th International Conference, pp. 85-59 (Feb. 23, 2003).

Koike T., et al. "Hybrid ARQ scheme suitable for coded MIMO transmission" Communications, IEEE International Conference, Paris, France, pp. 2919-2923 (Jun. 20, 2004).

Nagareda R et al. "OFDM mobile packet transmission system with multiuser detection and metric combining ARQ" Vehicular Technology Conference, 2004 VTC2004-Fall. 2004 IEEE 60th Los Angeles, CA USA, pp. 709-713 (Sep. 26, 2004).

Samra H; Zhi Ding "New MIMO ARQ protocols and joint detection via sphere decoding" IEEE Transactions on Signal Processing [online], pp. 473-482 (Feb. 28, 2006).

Samra Harvino, Ding Zhi "Sphere decoding for retransmission diversity in MIMO flat-fading channels" ICASSP IEEE Int. Conf. Acoust. Speech Signal Process [online], pp. 585-588 (May 17, 2004).

Schmitt M. P. "Improved retransmission strategy for hybrid ARQ schemes employing TCM" Wireless Communications and Networking Conference, 1999 IEEE New Orleans, LA, pp. 1226-1228 (Sep. 21, 1999).

Tirkkonen, O et al. "Square-Matrix Embeddable Space-Time Block Codes for Complex Signal Constellations," IEEE Trans. Info. Theory, vol. 48, pp. 384-395 (Feb. 2002).

Tong, Wen et al. Soft packet combing for STC re-transmission to improve H-ARQ performance in MIMO mode. Proposal for IEEE 802.16 Broadband Wireless Access Working Group, pp. 1-5 (Jul. 7, 2004).

Chase, David. "Code Combining—A Maximum-Likelihood Decoding Approach for Combining an Arbitrary Number of Noisy Packets" *IEEE Transactions on Communications*, vol. Comm-33 No. 5, pp. 385-393 (May 1985).

802.16e: IEEE Standard for Local and metropolitan area networks Part 16: Air Interface for Fixed and Mobile Broadband Wireless Access Systems Amendment for Physical and Medium Access Control Layers for Combined Fixed and Mobile Operation in Licensed Bands, pp. 1-3, 485-495, 635, and 649-650 (Feb. 2006).

Onggosanusi, Eko N. et al. "Hybrid ARQ Transmission and Combining for MIMO systems" *IEEE*. (2003).

Krishnaswamy, Dilip, et al. "Multi-Level Weighted Combining of Retransmitted Vectors in Wireless Communications." *IEEE VTC*. (Sep. 2006).

Alamouti, Siavash, M. "A Simple Transmit Diversity Technique for Wireless Communications." IEEE Journal on Select Areas in Communications, vol. 16, No. 8. (Oct. 1998).

Arkhipov, Alexander et al. "OFDMA-CDM Performance Enchancement by Combining H-ARQ and Interference Cancellation" IEEE Journal on Selected Areas in Communications, vol. 24, No. 6, pp. 1199-1207 (Jun. 2006).

Cioffi, John et al. "Generalized decision-feedback equalization for packet transmission with ISI and gaussian noise", Communications, computation, control and signal processing: a tribute to Thomas Kailath, pp. 79-127 (1997).

Davis, Linda M. "Scaled and Decoupled Cholesky and QR Decompositions with Application to Spherical MIMO Detection" IEEE Wireless Communications and Networking, vol. 1, pp. 326-331 (2003).

Dekorsy, Armin "A Cutoff Rate based Cross-Layer Metric for MIMO-HARQ Transmission" IEEE 16th Internal Symposium on Personal, Indoor and Mobile Radio Communications, vol. 4, pp. 2166-2170 (2005).

Ginis, George et al. "On the Relation Between V-BLAST and the GDFE", IEEE Communications Letters, vol. 5, No. 9, pp. 364-366 (Sep. 2001).

Hassibi, Babak "An Efficient Square-Root Algorithm for BLAST", IEEE International Conference on Acoustics, Speech, and Signal Processing, vol. 2, pp. 737-740 (2000).

Liu, Peng et al. "A New Efficient MIMO Detection Algorithm based on Cholesky Decomposition," The 6th International Conference on Advanced Communication Technology, vol. 1, pp. 264-268 (2004).

Nakajima, Akinori et al. "Throughput of Turbo Coded Hybrid ARQ Using Single-carrier MIMO Multiplexing" IEEE 61st Vehicular Technology Conference, vol. 1, pp. 610-614 (2005).

Nakajima, Akinori et al. "Iterative Joint PIC and 2D MMSE-FDE for Turbo-coded HARQ with SC-MIMO Multiplexing" IEEE 63rd Vehicular Technology Conference, vol. 5, pp. 2503-2507 (May 2006).

Oh, Mi-Kyung et al. "Efficient Hybrid ARQ with Space-Time Coding and Low-Complexity Decoding" IEEE Conference on Acoustics, Speech, and Signal Processing, vol. 4, pp. 589-592 (2004).

Rontogiannis, Athanasios A. et al. "An Adaptive Decision Feedback Equalizer for Time-Varying Frequency Selective MIMO Channels" IEEE 7th Workshop on Selective MIMO Channels Signal Processing Advances in Wireless Communications, pp. 1-5 (Jul. 2006).

Wolniansky, P.W. et al. "V-BLAST: An Architecture for Realizing Very High Data Rates Over the Rich-Scattering Wireless Channel", URSI International Symposium on Signals, Systems, and Electronics, pp. 295-300 (1998).

Wübben, Dirk et al. "MMSE Extension of V-BLAST based on Sorted QR Decomposition" IEEE 58th Vehicular Technology Conference, vol. 1, pp. 508-512 (2003).

Wu, J. et al., "The Performance of TCM 16-QAM with Equalization, Diversity, and Slow Frequency Hopping for Wideband Mobile Communications", 1998, Personal, Indoor and Mobile Radio Communication, vol. 3, pp. 1346-1350.

* cited by examiner

4-QAM

16-QAM

$$\mathbf{y}^{(i)} = \begin{bmatrix} y_1 \\ \vdots \\ y_{N_r} \end{bmatrix}^{(i)} = \begin{bmatrix} h_{11} & h_{12} \\ \vdots & \vdots \\ h_{N_r,1} & h_{N_r,2} \end{bmatrix}^{(i)} \begin{bmatrix} x_1 \\ x_2 \end{bmatrix}^{(i)} + \begin{bmatrix} n_1 \\ \vdots \\ n_{N_r} \end{bmatrix}^{(i)}$$

$$\mathbf{y}^{(i)} = H^{(i)} \mathbf{x}_1 + \mathbf{n}^{(i)}$$

FIG. 5
*PRIOR ART*

DECODING METHOD FOR ALAMOUTI SCHEME WITH HARQ AND/OR REPETITION CODING

CROSS-REFERENCE TO RELATED APPLICATIONS

This application claims the benefit under 35 U.S.C. §119 (e) of U.S. Provisional Application Nos. 60/825,443, filed Sep. 13, 2006, and 60/949,160, filed Jul. 11, 2007, which are hereby incorporated herein by reference in their entirety.

BACKGROUND OF THE INVENTION

This invention relates to a decoding technique, where the receiver may receive multiple instances of the same transmitted signals.

In a data transmission or storage system, it is desirable for information, often grouped into packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and/or receiver, and of their respective components.

However, the transmitter may be unaware of how the channel will affect a transmitted signal, and may not be able to transmit information in a way that will be effective for a particular channel. For example, the transmitter may be a wireless router, where the channel varies depending on its surroundings. One technique to increase reliability when the transmitter does not have information about the channel is to increase the number of outputs (e.g., antennas) that the same information is transmitted. Thus, the same information may travel through multiple paths, allowing the receiver to more reliably estimate the transmitted information. This transmission technique is referred to as transmit diversity.

Even using transmit diversity, the receiver may still interpret the information incorrectly because of excessive channel effects and any additive noise that is independent of the channel. These errors may be corrected using an error correction scheme. To correct errors that may occur, redundancy is often added to a data stream. Therefore, when a reasonably small number of errors occur, there is still enough information to make an accurate determination of the transmitted sequence. The redundancy added to the data stream is determined based on an error correction code, such as a Reed-Solomon or Golay code.

One straightforward way to implement an error correction scheme is to use forward error correction (FEC). The transmitter encodes the data according to an error correction code and transmits the encoded information. Upon reception of the data, the receiver decodes the data using the same error correction code, ideally eliminating any errors. Therefore, "decoding" is hereinafter referred to as a method for producing an estimate of the transmitted sequence in any suitable form (e.g., a binary sequence, a sequence of probabilities, etc.)

Another way to implement a code for error correction is to use automatic repeat request (ARQ). Unlike FEC, ARQ schemes use error-detecting rather than error-correcting codes. The ARQ transmitter encodes data based on an error-detecting code, such as a cyclic redundancy check (CRC) code. After decoding the data based on the error-detecting code, if an error is detected, the receiver sends a request to the transmitter to retransmit that codeword. Thus, ARQ protocols require a forward channel for communication from transmitter to receiver and a back channel for communication from receiver to transmitter. Ultimately, the receiver will not accept a packet of data until there are no errors detected in the packet.

Finally, FEC and ARQ may be combined into what is known as hybrid automatic repeat request (HARQ). One type of HARQ, referred to as HARQ type-I, typically uses a code that is capable of both error-correction and error-detection. For example, a codeword may be constructed by first protecting the message with an error-detecting code, such as a CRC code, and then further encoding the CRC-protected message with an error-correcting code, such as a Reed-Solomon, Golay, convolutional, turbo, or low-density parity check (LDPC) code. When the receiver receives such a code, it first attempts FEC by decoding the error correction code. If, after error detection, there are still errors present, the receiver will request a retransmission of that packet. Otherwise, it accepts the received vector.

It may be beneficial for an ARQ or HARQ receiver to utilize data from multiple transmissions of a packet, because even packets that contain errors carry some amount of information about the transmitted packet. For situations when the transmitter is unaware of the channel characteristics, it may be beneficial to use a transmit diversity scheme with ARQ or HARQ to create an even more reliable system. However, it is not clear how information received in a system that combines transmit diversity and HARQ may be effectively decoded. Therefore, it would be desirable to provide a way to efficiently and accurately decode information received in a system with both transmit diversity and ARQ or HARQ.

SUMMARY OF THE INVENTION

Accordingly, systems and methods for reliable transmission and reception are disclosed, where transmit diversity is utilized, and where the receiver receives multiple sets of information from the transmitter.

The transmitter may send two symbols, $x_1$ and $x_2$, or $x_1$ in vector form, from each of its two outputs to the receiver. In the next time interval (or "symbol period"), the transmitter may send $-x_2^*$ and $x_1^*$, or $x_2$, from the outputs, thereby transmitting information about both $x_1$ and $x_2$ again. Using this scheme, information about each symbol is transmitted from both antennas. Thus, this technique is utilizes transmit diversity. The receiver, which has $N_r \geq 1$ inputs, may receive two $N_r$-dimensional signal vector corresponding to the two separate transmissions in time. In accordance with one aspect of the invention, the transmitter sends the same two transmissions multiple times to the receiver according to some protocol. Two protocols that may be used are HARQ type-I and repetition coding, or a combination of the two.

After receiving both $x_1$ and $x_2$ as $y_1$ and $y_2$, respectively, the receiver may combine the two vectors into a $2N_r$-dimensional vector, given by, $$y = \begin{bmatrix} y_1 \\ y_2^* \end{bmatrix} = H_{\mathit{eff}} \begin{bmatrix} x_1 \\ x_2 \end{bmatrix} + n,$$

where $y_2^*$ is the complex conjugate of $y_2$. Because of the particular way in which $x_1$ and $x_2$ are transmitted, $H_{\mathit{eff}}$ has the property that $H_{\mathit{eff}}^* H_{\mathit{eff}} = \|H\|_F^2 I_2$, where $\|H\|_F^2$ is the Frobenius norm of the channel matrix H that affected that transmissions of $x_1$ and $x_2$. Unlike H or $H_{\mathit{eff}}$, $\|H\|_F^2$ may be is a scalar, real value rather than a complex matrix.

To take advantage of this property, the receiver multiplies y by $H_{\mathit{eff}}^*$. The resulting signal vector, $\tilde{y}=\|H\|_F^2 x_1+\tilde{n}$, may therefore be a noisy, scaled version of $x_1$. Because the transmitter sends $x_1$ and $x_2$ multiple times according to some suitable protocol, the receiver may receive $y_1$ and $y_2$, or collectively y, multiple times. For simplicity, the y corresponding to the ith transmission will be referred to as $y^{(i)}$. The receiver may obtain processed versions of each $y^{(i)}$, and may then combine the multiple processed signal vectors, referred to as $\tilde{y}^{(1)}, \ldots, \tilde{y}^{(N)}$, to produce a final combined signal vector. This combined signal vector may still have the property of being a noisy, scaled version of $x_1$, where the noise is white (that is, the noise has a flat power spectral density). Therefore, the combined signal vector may be decoded using a maximum-likelihood (ML) decoder, or any other suitable decoder. The ML decoder may output an estimate of $x_1$ using any suitable output type (e.g., hard output, LLRs, probabilities, etc.). To compute the estimate, the ML decoder may need information about the channel. The information may include the sum of $\|H\|_F^2$ for all instances of y that are utilized in the combined processed signal vector.

In some embodiments, such as when an ARQ or HARQ protocol is used, the multiple receptions of y may occur in distinct time intervals. For example, each signal vector may be received and decoded sequentially. Therefore, the receiver may include a storage system to store intermediate values of $\Sigma_{i=1} \|H^{(i)}\|_F^2$ and intermediate values of the combined, processed signal vector. After a new y is received by the receiver, the processed version of the newly received vector, or $\tilde{y}$, may be combined with the combined, processed signal vector stored in the storage. Therefore, a new combined, processed signal vector may be obtained without re-computing any of the information associated with previously received signal vectors. Similarly, $\|H\|_F^2$ may be calculated for a newly received y, and $\|H\|_F^2$ may be combined with the stored value of $\Sigma_{i=1} \|H^{(i)}\|_F^2$ to create an updated version of the summation. The newly calculated combined, processed signal vector and $\Sigma_{i=1} \|H^{(i)}\|_F^2$ may be stored by overwriting the previously stored values in the storage system.

Using the techniques described above, overall one symbol of information is transferred from transmitter to receiver at each symbol period even though multiple transmit outputs are utilized. As described above, this type of transmission scheme may be referred to as a transmit diversity scheme. In some embodiments, the transmitter and receiver may also communicate using a spatial multiplexing scheme. That is, the transmitter can divide digital information into multiple, independent streams, and may transmit each stream using a different output. Using a spatial multiplexing scheme, the data rate can be increased without bandwidth expansion to multiple symbols per symbol period.

The transmitter and receiver may communicate using either of these transmission schemes at any given time. For example, in some embodiments, the transmitter may alternate between using transmit diversity and spatial multiplexing at an agreed upon frequency. In other embodiments, the transmission scheme may be chosen based on the quality of the channel. Transmit diversity may be more effective when the channel quality is poor, while spatial diversity allows for a higher data rate when the channel quality is high. Therefore, in some embodiments, the receiver may request that the transmitter use a particular transmission scheme based on computing a performance metric indicative of channel quality (e.g., bit error rate).

A receiver configured for both transmit diversity and spatial multiplexing can receive a first signal vector corresponding to a plurality of symbols. If transmit diversity is currently being used, the receiver may then receive a second signal vector corresponding to the same symbols, and may concatenate this information with the first signal vector to form a signal vector with double the number of dimensions. The resulting signal vector may be referred to as an enhanced signal vector, because it includes more information about each symbol than a received signal vector. The receiver then forms a combined signal vector. The combined signal vector includes information about any previously received signal vectors, as well as the enhanced signal vector if transmit diversity is used, or only the first signal vector if spatial multiplexing is used. The receiver may then decode the combined signal vector to estimate the transmitted symbols.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which:

FIG. 5 is a vector model of the system in FIG. 1;

DETAILED DESCRIPTION OF THE INVENTION

The disclosed invention provides a technique for decoding received symbols, where multiple copies of the same transmitted symbols are received.

Figure 1:
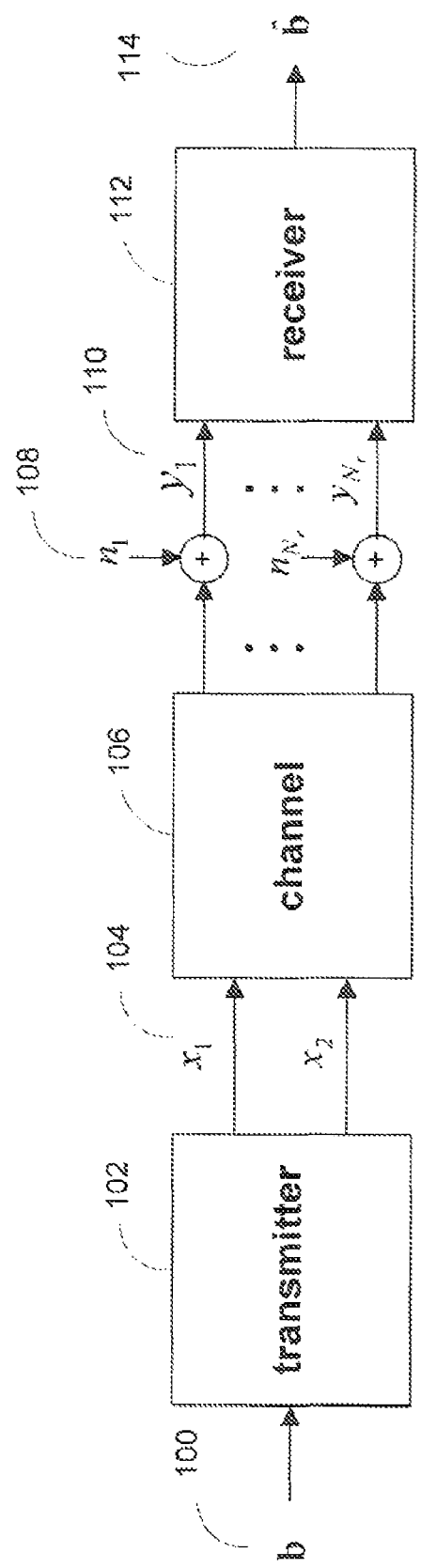
FIG. 1 is a high level block diagram of a multiple-input multiple-output data transmission or storage system.

FIG. 1 shows an illustration of a basic data transmission or storage system in accordance with one embodiment of the present invention. Data is sent from transmitter 102 to receiver 112. During transmission, the signals may be altered by a transmission medium, represented by channel 106, and additive noise sources 108. Transmitter 102 may have two outputs 104 and receiver 112 may have $N_r$ inputs 110, so channel 106 is modeled as a multiple-input multiple-output (MIMO) system with two inputs and $N_r$ outputs. The two inputs and $N_r$ outputs are typically implemented spatially to create a system with transmit diversity.

Figure 2:
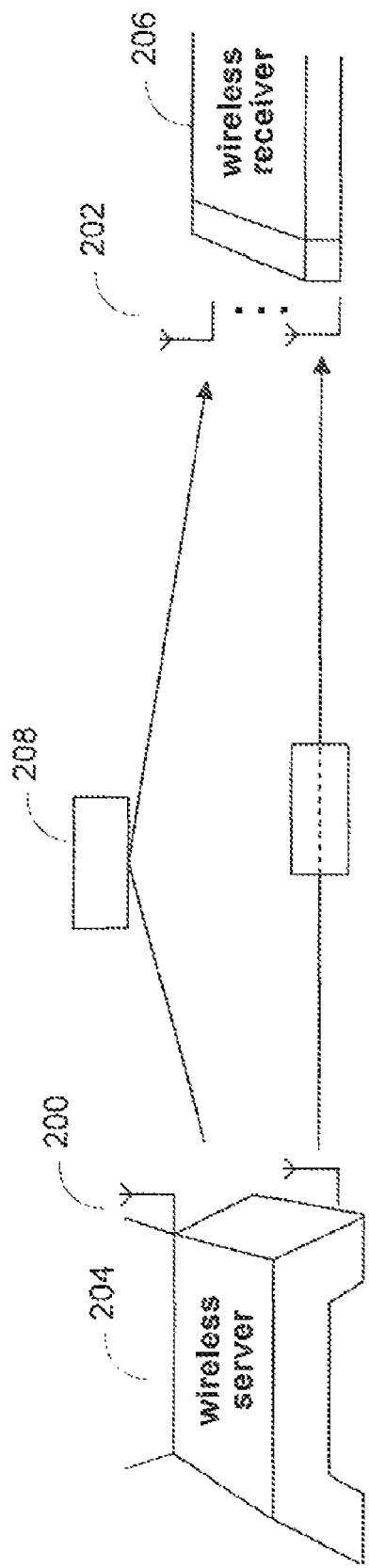
FIG. 2 is a wireless transmission system in accordance with one embodiment of the system in FIG. 1.

In one embodiment, FIG. 1 represents a wireless communication system, pictured in FIG. 2. In this embodiment, transmitter 102 is a wireless server 204, such as a commercial gateway modem, and receiver 112 is a wireless receiver 206, such as a commercial wireless computer adapter. Channel 106 is space 208 between wireless server 204 and wireless receiver 206, which obstructs and attenuates the signal due to at least time-varying multipath fades and shadowing effects. Typically, wireless communication systems use multiple transmitting antennas 200 and receiving antennas 202 to implement the MIMO system.

Returning to FIG. 1, transmitter 102 prepares bit sequence 100 into signals capable of transmission through channel 106. For an uncoded system, bit sequence 100 is a binary message, where the message carries only information bits. Alternatively, for a coded system, bit sequence 100 may be an encoded version of the message. Thus, bit sequence 100 may have originated from a binary data source, from the output of a source encoder (not pictured), or from any other suitable source that outputs a bit sequence.

Figure 3:
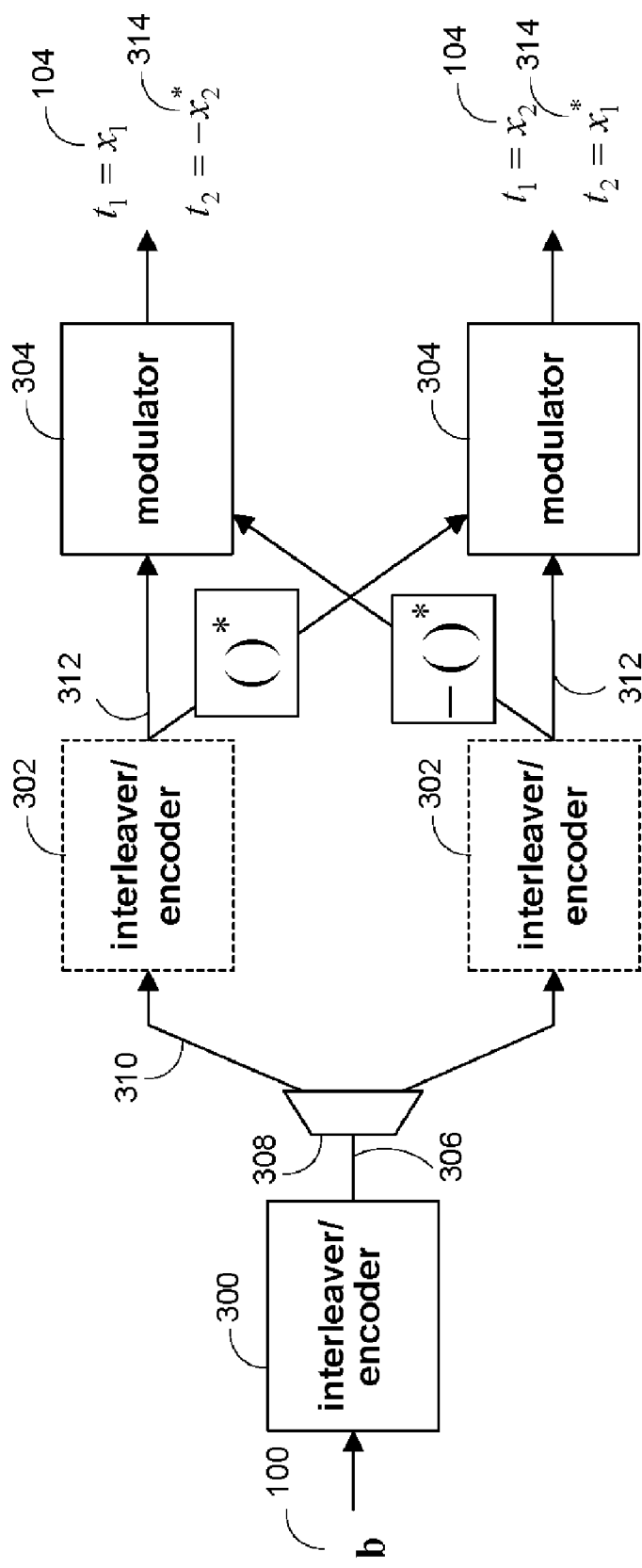
FIG. 3 is a block diagram of a transmitter.

One simplified embodiment of transmitter 102 is shown in FIG. 3. Transmitter 102 converts bit sequence 100 into signals 104 appropriate for transmission through channel 106 (FIG. 1). Bit sequence 100 is passed through interleaver/encoder 300 for interleaving and/or encoding bit sequence 100. If interleaver/encoder 300 encodes bit sequence 100, the encoding may be based on any suitable error correcting or error detecting code (e.g., CRC code, convolutional code, Turbo code, LDPC code). Also, by interleaving bit sequence 100, each bit in bit sequence 100 may be assumed to be independent of all other bits in bit sequence 100. Bit sequence 306 at the output of interleaver/encoder 300 may be demultiplexed by demultiplexor 308 across two paths 310. Each demultiplexed output 310 may or may not go through another interleaver and/or encoding block 302, yielding bit sequences 312. Finally, bit sequences 312 are modulated with modulators 304, which group bit sequences 312 into m-bit symbols, and transmits each symbol as a signal.

During a first time interval corresponding to a transmission of one symbol at each modulator output, the transmitter may transmit symbols $x_1$ and $x_2$ 104, or $x_1$ in vector form. A time interval corresponding to a transmission of one symbol from a given output is referred to as a symbol period. In the next symbol period, rather than transmitting the next two m-bit symbols in bit sequence 312, the transmitter may send information about $x_2$ from the first output, and may send information about $x_1$ from the second output. In particular, the transmitter may send $-x_2^*$ and $x_1^*$ 314 at the first and second outputs, respectively, where $-x_2^*$ is the negative of the complex conjugate of $x_2$ and $x_1^*$ is the complex conjugate of $x_1$. The vector of $x_2$ and $x_1^*$ is referred to as $x_2$, because it is sent in the next symbol period. Therefore, using this transmission scheme, all of the information in bit sequence 100 is transmitted from both outputs of the transmitter. This transmit diversity transmission scheme is hereinafter referred to as the Alamouti scheme.

Figure 4A:
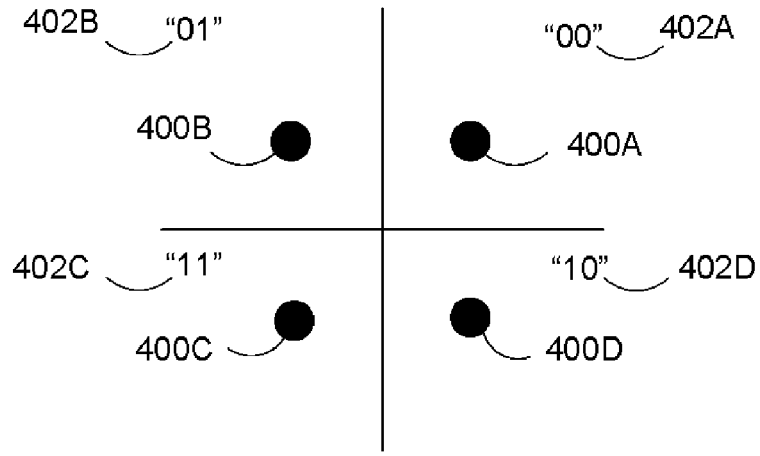
FIG. 4A is a signal constellation set for quadrature amplitude modulation with four signal points (4-QAM)

To transmit bit sequences 312 as $x_1$ and $x_2$, modulators 304 group the incoming bits of sequences 312 into symbols. The symbols may then be mapped and converted to signals according to a signal constellation set and carrier signal. In one embodiment of the invention, modulator 304 uses quadrature amplitude modulation (QAM). Each symbol is mapped to a signal point in the QAM signal constellation set, where the signal points are differentiated from one another by phase and/or magnitude. For example, FIG. 4A shows a 4-QAM signal constellation set in a complex number plane. In this case, signal points 400A-400D are distinguishable only by phase. Each signal point represents a different two-bit symbol 402: 400A represents "00," 400B represents "01," 400C represents "11," and 400D represents "10." However, any other one-to-one mapping from symbol to signal point is valid.

Figure 4B:
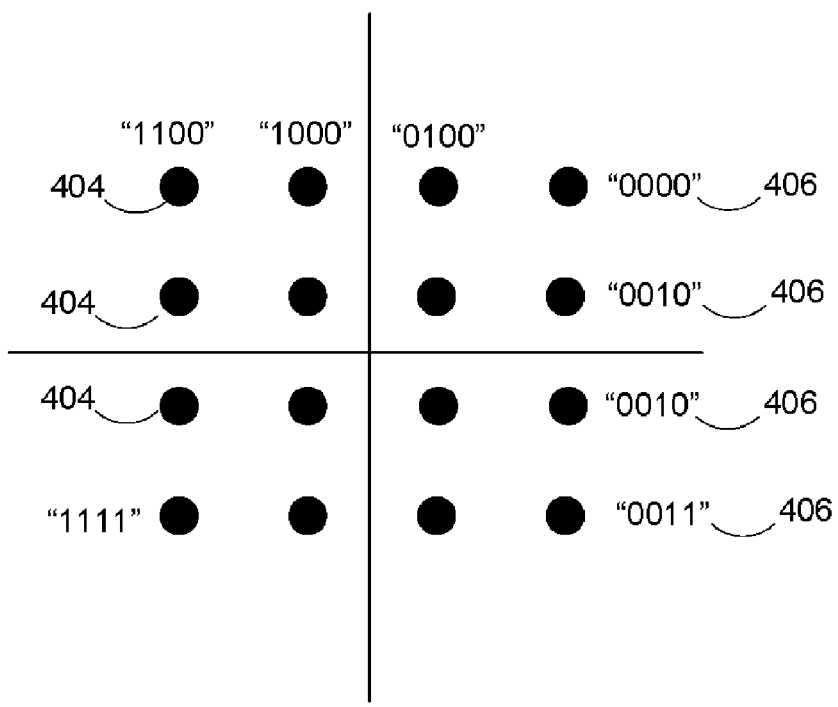
FIG. 4B is a signal constellation set for quadrature amplitude modulation with 16 signal points (16-QAM)

FIG. 4B shows a 16-QAM signal constellation set, where four-bit sequences 406 are combined into one symbol. Here, both the amplitudes and the phase of signal points 404 may vary. FIG. 4B shows a partial mapping from symbols 406 to signal points 404, where the each symbol is shown closest to its corresponding signal point. However, as before, any other mapping is possible. In general, an m-bit symbol may be mapped according to an M-QAM signal set, where $M=2^m$. Therefore, for the transmitter configuration shown in FIG. 3, transmitter 102 is capable of transmitting 2m bits concurrently.

Transmitter 102 may send signal vectors $x_1$ and $x_2$ multiple times according to a protocol that is also known and followed by receiver 112. Depending on the protocol, there may be additional components in transmitter 102 that are not shown in FIG. 3. Therefore, it should be understood that transmitter 102 may be altered in order to implement such protocols. For example, if an automatic repeat request (ARQ) protocol is used, transmitter 102 may need a buffer to store $x_1$ or $x_2$, or equivalently bit stream 100, in the event that a retransmission is requested.

Even though $x_1$ and $x_2$ are transmitted in alternating symbol periods, because of channel 106 (FIG. 1) and additive noise sources 108, receiver 112 in FIG. 1 actually receives $y_1^{(i)}$ and $y_2^{(i)}$, where $$y_1^{(i)} = H^{(i)} x_1 + n_1^{(i)} \quad (1)$$

$$y_2^{(i)} = H^{(i)} x_2 + n_2^{(i)} \quad (2)$$

and i=1, ..., N. Index i represents the ith instance that the same pair of transmitted vectors, and $x_2$, are transmitted. Therefore, 2N total symbol periods are used for the transmissions, and information about each of the two transmit symbols, $x_1$ and $x_2$, is transmitted N times from each transmitter output. For clarity, FIG. 5 shows the components of each vector in equation (1). $H^{(i)}$ 500 is a $N_r \times 2$ channel matrix that defines how channel 106 alters the transmitted vectors, $x_1$ and $x_2$. It may be assumed that the channel characteristics do not change in two successive symbol periods, e.g., from transmitting $x_1$ to transmitting $x_2$. Therefore, channel matrix $H^{(i)}$ may be the same for both $y_1^{(i)}$ and $y_2^{(i)}$. $n^{(i)}$ is an $N_r \times 1$ vector of additive noise. $y_1^{(i)}$ and $y_2^{(i)}$ are $N_r \times 1$ vectors, where each vector component is the signal received by one of the $N_r$ inputs of receiver 112. As shown by FIG. 5, each symbol in $y^{(i)}$ has information about both transmitted symbols, $x_1$ and $x_2$. For example, $y_1$, the first component of $y^{(i)}$, is equal to $h_{11} x_1 + h_{12} x_2 + n_1$. Note that $y_1^{(i)}$ and $y_2^{(i)}$ may be different for each instance of i, because the characteristics of channel 106, reflected in matrix 500, and noise sources 108 may be different for each i. Differences may arise because each transmission of $x_1$ and $x_2$ occurs at a different time or through a different medium.

In one embodiment, noise sources 108 may be modeled as additive white Gaussian noise (AWGN) sources. In this case, noise sources 108 are independent and identically distributed (i.i.d). That is, the noise that affects any of the $N_r$ components in any $n^{(i)}$ does not affect the noise for any other component in $n^{(i)}$. Also, all of the noise sources have the same probabilistic characteristics. Furthermore, each component of $n^{(i)}$ has zero mean and is random in terms of both magnitude and phase, where the magnitude and the phase are also independent. This type of noise source is called an i.i.d. zero mean circularly symmetric complex Gaussian (ZMCSCG) noise source. If the variance of each component is $N_0$, then the conditional probability distribution function (pdf) of the received signal, $Pr\{y^{(i)}|x,H^{(i)}\}$, is given by $$Pr\{y^{(i)} | x, H^{(i)}\} = \frac{1}{(\pi N_0)^N} \exp\left\{-\frac{\|y^{(i)} - H^{(i)}x\|^2}{N_0}\right\} \quad (3)$$

Equation (3) will be used with reference to maximum-likelihood decoding discussed in greater detail below in connection with FIGS. 7A, 7B, 9, and 10.

Receiver 112 may use one or more of the N received copies of $x_1$ and $x_2$ to determine the information that was transmitted. It may be contemplated that receiver 112 could individually decode the N pairs of received symbols to produce N soft estimates for $x_1$ and $x_2$, and then could combine the N soft estimates. For example, each received signal vector, $y_1^{(i)}$ and $y_2^{(i)}$, could be decoded using maximum-likelihood (ML), where each ML decoder produces soft information in the form of log-likelihood ratios (LLR). An LLR is a common soft-bit metric associated with ML decoding, where the sign of the LLR indicates the most likely value of the transmitted bit (1 if positive, 0 if negative), and the magnitude of the LLR indicates the strength or confidence of the decision. The N LLRs could then be combined by addition.

However, in accordance with an embodiment of the present invention, a more accurate way to combine information from each transmission of $x_1$ and $x_2$ may be used. Rather than combining decoder outputs corresponding to estimates of the bit values of $x_1$ and $x_2$ (e.g., LLRs), the disclosed combining scheme combines the symbols of the received signals and decodes the combined signal vector. The combining scheme will be discussed in greater detail below in connection with FIGS. 7A and 9. It should be understood that the receiver may combine all pairs of received signal vectors or only a subset of the total received vectors. For example, a pair of received signal vectors and their corresponding channel matrices may be discarded if the magnitude of a component in one of the received signal vectors is below a certain threshold. Thus, the variable N should refer to the number of pairs of received signal vectors used by the receiver, which is not necessarily the same as the number of total pairs of signal vectors received.

Figure 6A:
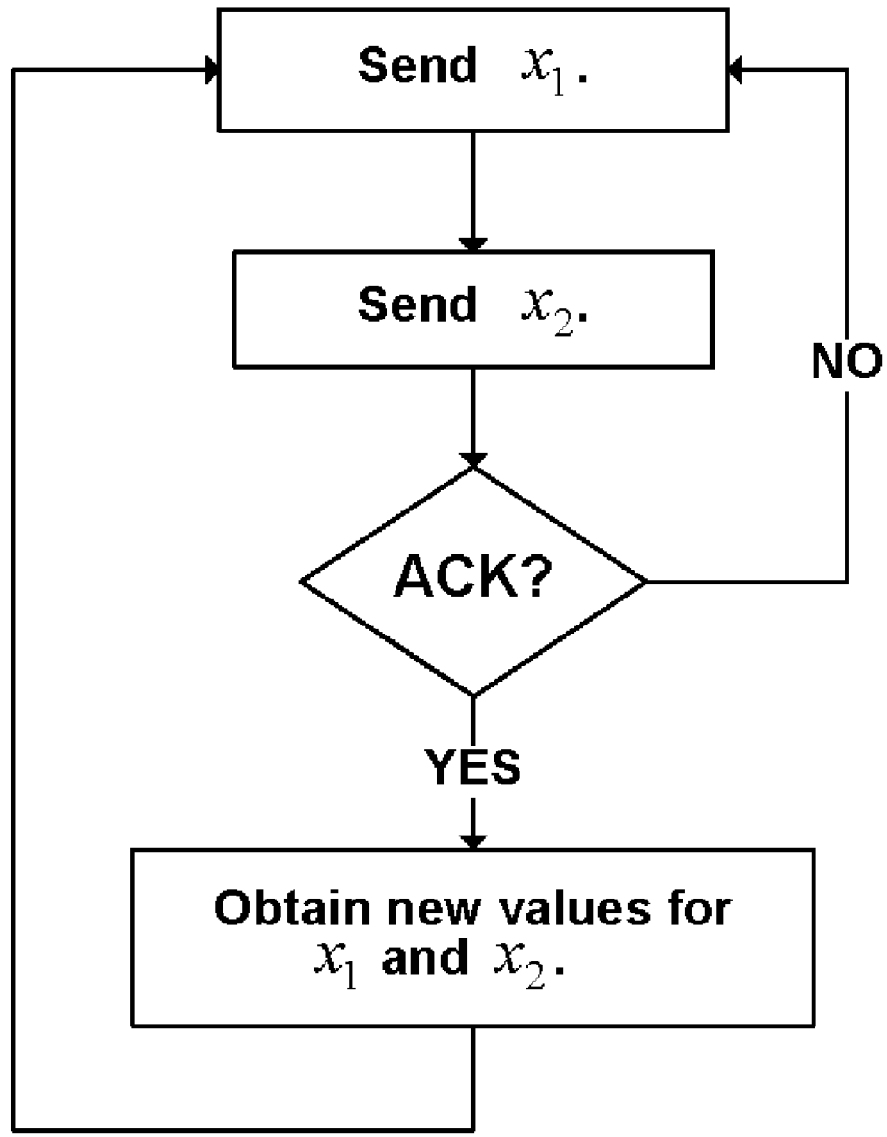
FIG. 6A is a flow diagram of a stop-and-wait HARQ transmitter.
Figure 6B:
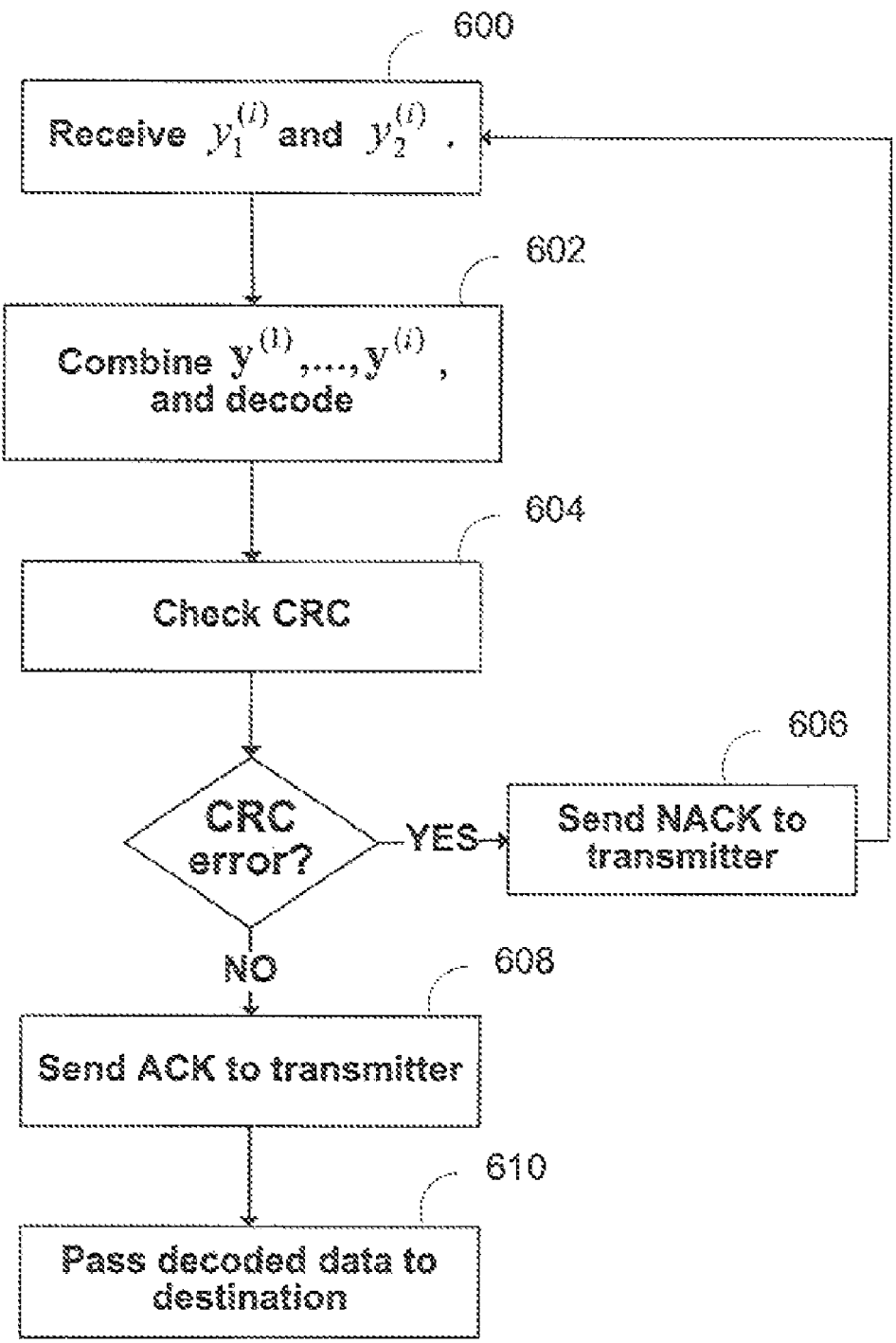
FIG. 6B is a flow diagram of a HARQ receiver.

In order for receiver 112 to obtain multiple signal vectors and combine them at the symbol level (rather than at the decoded, bit level), receiver 112 and transmitter 102 may use a retransmission protocol (e.g., ARQ, HARQ, etc.) or a fixed-N protocol (e.g., repetition coding). In one embodiment of the invention, receiver 112 may receive multiple instances of a common transmit vector using a HARQ type-I retransmission protocol. The flow chart of the steps taken by transmitter 102 and receiver 112 are shown in FIG. 6A and FIG. 6B, respectively. FIG. 6A shows a transmitter following a stop-and-wait protocol, where the transmitter sends signal vectors $x_1$ and $x_2$, and waits until the signal vectors have been accepted by the receiver before sending the next set of symbols in the sequence. The transmitter determines whether the signal vectors have been accepted based on whether an acknowledgement, or ACK, has been received from the receiver. Other protocols, such as go-back-N, selective repeat, or any other suitable protocol may be used in place of stop-and-wait. Therefore, it should be understood that FIG. 6A may be modified in order to implement a different protocol.

FIG. 6B shows a simplified flow chart of a HARQ type-I receiver protocol in accordance with one embodiment of the present invention. At step 600, receiver 112 may receive $y_1^{(i)}$ and $y_2^{(i)}$ in two consecutive symbol periods, where $y_1^{(i)}$ and $y_2^{(i)}$ correspond to the ith transmission of symbols $x_1$ and $x_2$, respectively. The receiver may treat the two received symbols as a two-entry vector, $$y^{(i)} = \begin{bmatrix} y_1^{(i)} \\ y_2^{(i)*} \end{bmatrix}.$$

At step 602, receiver 112 may combine all received vectors corresponding to $x_1$ and $x_2$, that is, $y^{(1)} \ldots, y^{(i)}$, into a single vector, $\tilde{y}$, and may decode the combined vector or a processed version of the combined vector. In FIG. 6B, decoding refers to determining the CRC-protected message based on the combined signal vector. Other possible decoding outputs will be discussed in greater detail below in connection with FIG. 7A. Errors that may occur if individual symbols were decoded may be corrected by combining the received signal vectors such that the combined signal vector, $\tilde{y}$, is correctable by decoding. Following decoding, error detection is performed at step 604, which, in this case, involves checking the CRC of the decoded vector. If errors are detected, the receiver may send a negative acknowledgement (NACK) message to the transmitter at step 606. Upon receipt of the NACK, the transmitter may send the same pair of signal vectors, which are received by the receiver at step 600 as $y^{(i+1)}$. $y^{(i+1)}$ may be different from $y^{(i)}$ even though the same transmit signal vectors $x_1$ and $x_2$ are used at the transmitter, because $y^{(i+1)}$ is transmitted at a later time than $y^{(i)}$ and may be affected by different noise and channel characteristics. The i+1 vectors may be combined and decoded, as described previously. This procedure may occur until the receiver has N total received vectors, when combining and decoding the N vectors produces a sequence that does not generate a CRC check error. At this point, the receiver sends an acknowledgment (ACK) message at step 608 back to the transmitter to inform the transmitter that the vector has been successfully received. Also, since there are no errors in the decoded data, the receiver passes the decoded data to the destination at step 610.

In another embodiment of the invention, the transmitter may send signal vectors $x_1$ and $x_2$ a fixed number of times, irrespective of the presence of errors. For example, the receiver may obtain N transmissions of $x_1$ and $x_2$ from repetition coding. In some embodiments, the transmitter may have more than two outputs, and therefore N copies of x may be transmitted simultaneously, or within some interval of time. Alternatively, N copies of $x_1$ and $x_2$ may be transmitted from the two outputs of the transmitter in 2N symbol periods. The receiver may combine signal vectors, $$y^{(1)} = \begin{bmatrix} y_1^{(1)} \\ y_2^{(1)*} \end{bmatrix}, \ldots, y^{(N)},$$

and may decode the combination or a processed version of the combination. Repetition coding may be useful when there is no feasible backchannel for the receiver to send retransmission requests.

HARQ type-I and repetition coding are two protocols that may be used in different embodiments of the present invention. Alternatively, repetition coding and HARQ can be combined such that multiple pairs of symbols are received at step 600 before combining and decoding at step 602. The invention, however, is not limited to the two protocols and their combination mentioned here. Currently, the IEEE 802.16e standard uses HARQ and repetition coding, so these particular protocols merely illustrate embodiments of the invention. In fact, any protocol that allows the receiver to receive multiple copies of the same transmitted vector fall within the scope of the present invention.

Figure 7A:
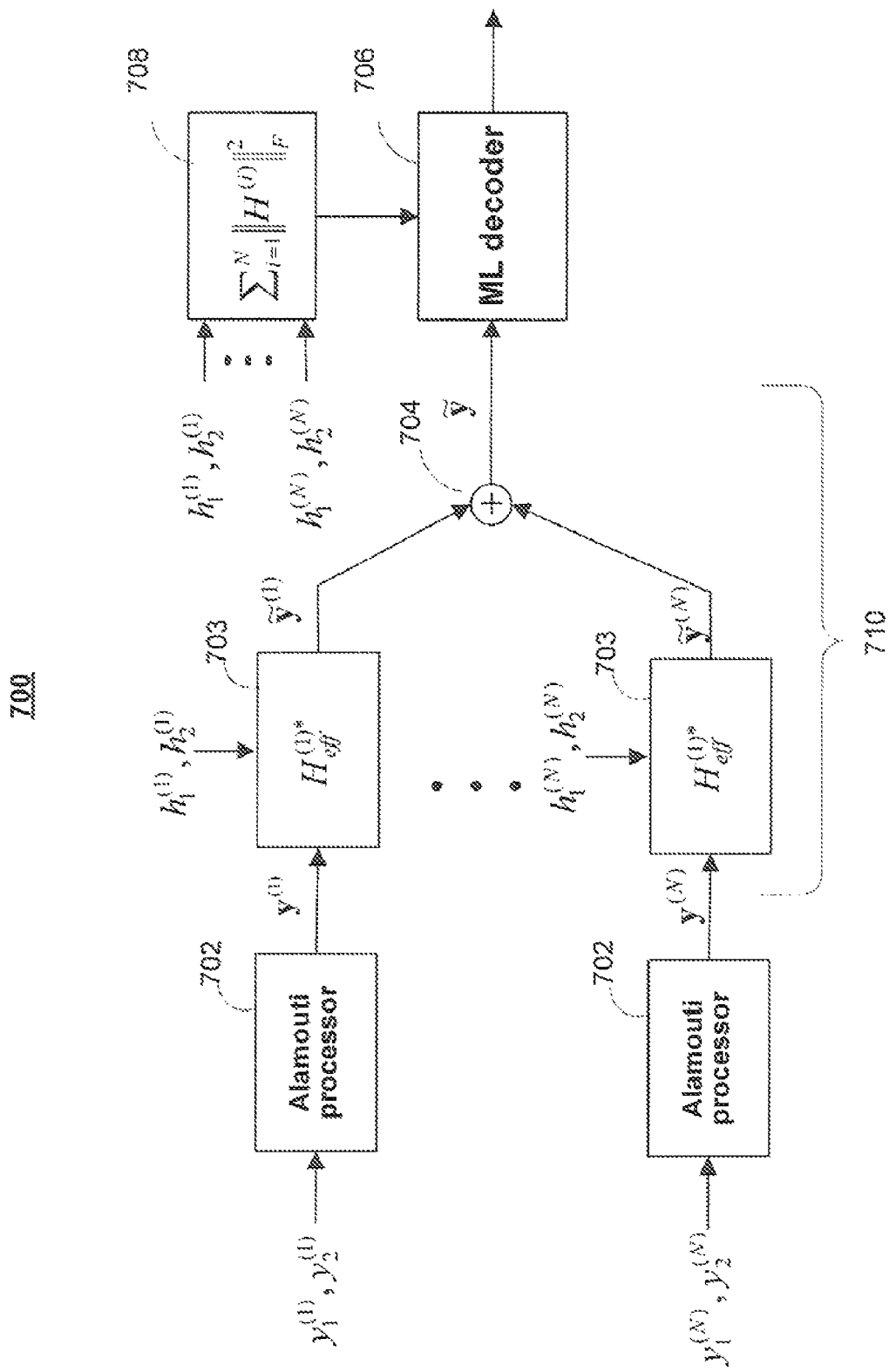
FIGS. 7A and 7B are block diagrams of receivers for decoding N pairs of received symbols or signal vectors.
Figure 7B:
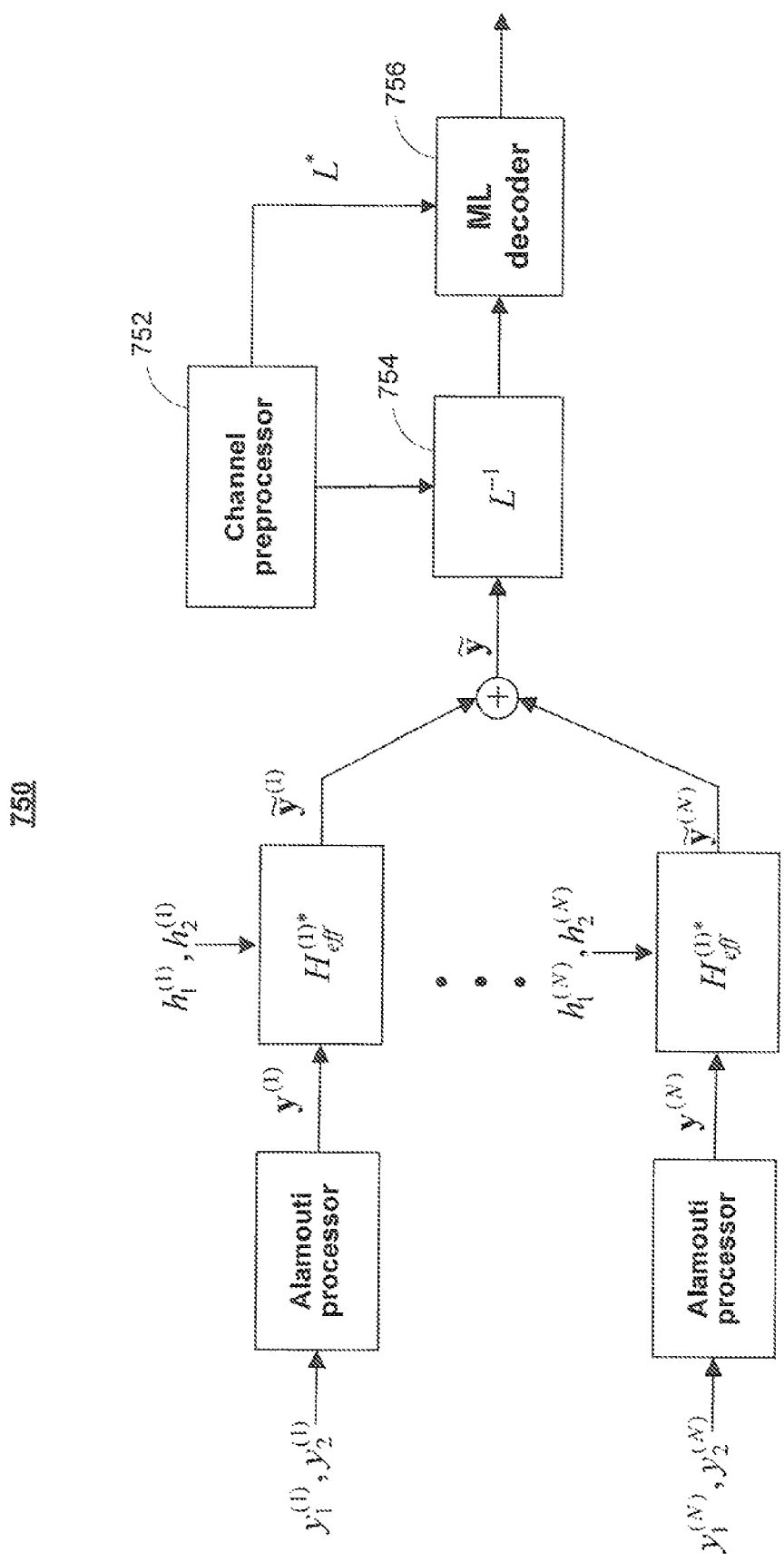
Figure 9:
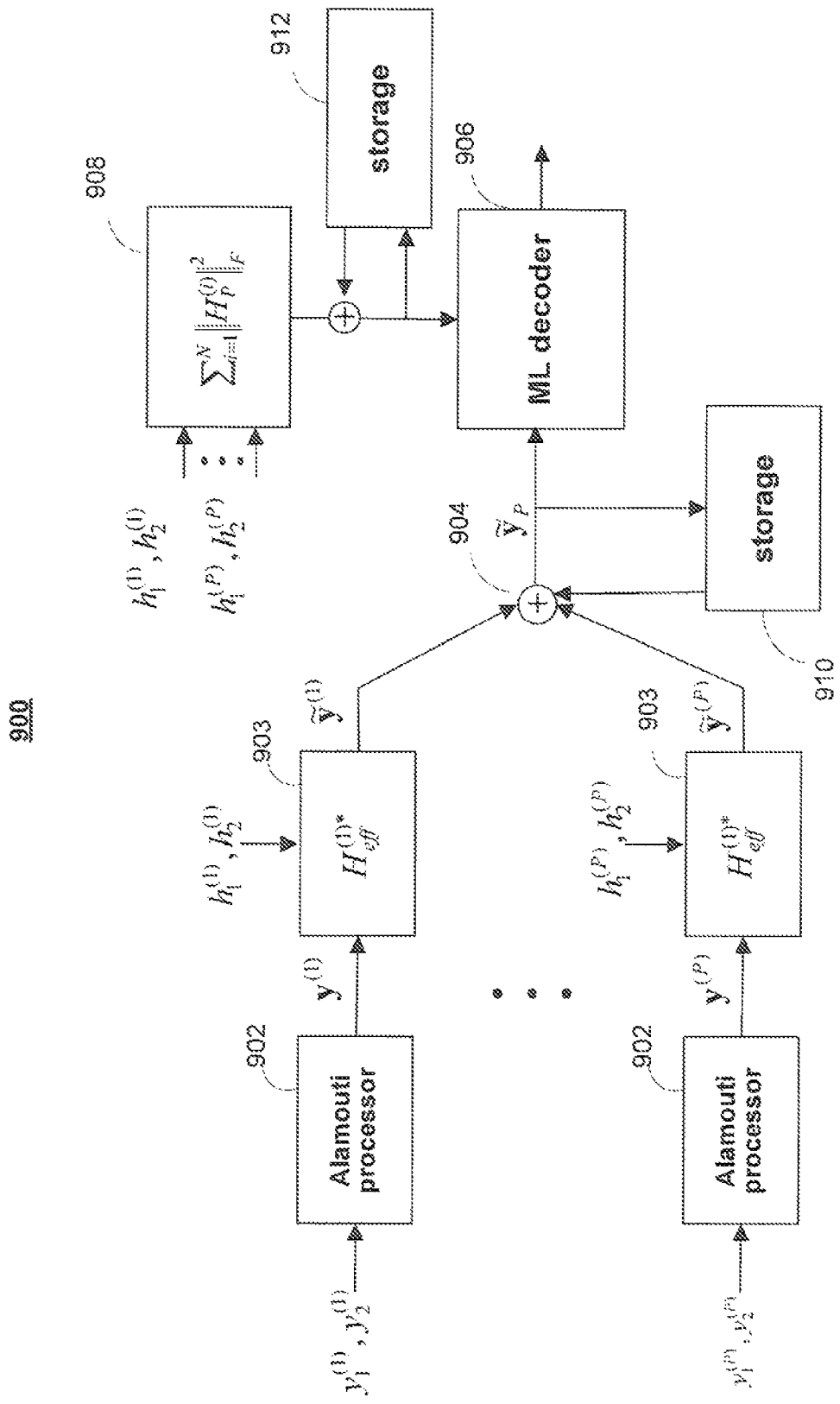
FIG. 9 is a block diagram of a receiver for decoding P pairs of received symbols or signal vectors.

FIGS. 7A, 7B, and 9 show illustrative and simplified block diagrams of receivers for combining and decoding N pairs of received symbols. These receiver configurations may be used to implement step 602 of the HARQ protocol in FIG. 6B. For simplicity, it is first assumed that $N_r=1$. However, as discussed in greater detail below, any of the techniques disclosed in the present invention may be used for the case where $N_r \geq 1$. For $N_r=1$, equations (1) and (2) for the received signal vectors, $y_1^{(i)}$ and $y_2^{(i)}$, and the equation in FIG. 5, reduce to, $$y_1^{(i)} = H^{(i)} \begin{bmatrix} x_1^{(i)} \\ x_2^{(i)} \end{bmatrix} + n_1^{(i)} \tag{4}$$

$$y_2^{(i)} = H^{(i)} \begin{bmatrix} -x_2^{(i)*} \\ x_1^{(i)*} \end{bmatrix} + n_2^{(i)}. \tag{5}$$

where $H=[h_1^{(i)} h_2^{(i)}]$. Equations (4) and (5) may be combined into a single equation, given by, $$y^{(i)} = \begin{bmatrix} y_1 \\ y_2^* \end{bmatrix}^{(i)} = \begin{bmatrix} h_1 & h_2 \\ h_2^* & -h_1^* \end{bmatrix}^{(i)} \begin{bmatrix} x_1 \\ x_2 \end{bmatrix} + \begin{bmatrix} n_1 \\ n_2^* \end{bmatrix}^{(i)} \tag{6}$$

$$= H_{\text{eff}}^{(i)} x + n^{(i)} \tag{7}$$

Therefore, the received symbols in any time instant i may be modeled as a single, two-component signal vector, $y^{(i)}$, affected by an effective channel, $H_{\text{eff}}^{(i)}$, and additive white Gaussian noise $n^{(i)}$.

Referring first to FIG. 7A, a simplified block diagram of receiver 700 is shown for decoding N pairs of received symbols. Receiver 700 can include one or more Alamouti processors 702 and signal processors 703, as well as adder 704, ML decoder 706, and channel preprocessor 708. Each vector $y^{(i)}$ may be processed by one of Alamouti processors 702 and signal processors 703. Alamouti processors 702 prepare signal vectors, $y^{(i)}$, based on the signal or signals received in two symbol periods. In some embodiments, Alamouti processor 702 includes a storage device (e.g., registers) for maintaining the value of the signals received in the first symbol period while obtaining the value of the signals in the second symbol period.

Signal processors 703, coupled to each of Alamouti processors 702, process the signal vectors produced by Alamouti processors 702 based on channel information. Signal processors 703 multiply these signal vector by the conjugate transpose of the effective channel matrix, $H_{\text{eff}}^{(i)*}$. Therefore, the output of each processor is, $$\tilde{y}^{(i)} = H_{\text{eff}}^{(i)*} y^{(i)} \tag{8}$$

$$= H_{\text{eff}}^{(i)*} H_{\text{eff}}^{(i)} x + H_{\text{eff}}^* n^{(i)} \tag{9}$$

$$= \tilde{H}^{(i)} x_1 + \tilde{n}^{(i)}, \tag{10}$$

where $\tilde{H}^{(i)} = H_{\text{eff}}^{(i)*} H_{\text{eff}}^{(i)}$ and $\tilde{n}^{(i)} = H_{\text{eff}}^{(i)*} n^{(i)}$. As illustrated in equation (10), each processed vector may be treated as a single received signal vector affected by a channel with response $\tilde{H}^{(i)}$ and additive noise sources $\tilde{n}^{(i)}$. Due to the particular characteristics of $H_{\text{eff}}^{(i)}$, $\tilde{H}^{(i)}$ is a diagonal matrix, where each component along its diagonal is equal to $|h_1^{(i)}|+|h_2^{(i)}|^2$, the sum of the squares of the actual channel responses, $h_1^{(i)}$ and $h_2^{(i)}$. In general, $\tilde{H}^{(i)}$ may be given by $\|H^{(i)}\|_F^2 I_2$, where $I_2$ is the 2×2 identity matrix, and $\|A\|_F^2 = \sum_{i=1}^{M} \sum_{j=1}^{N} |a_{ij}|^2$. $\|A\|_F^2$ is referred to as a Frobenius norm of a matrix A, where $a_{ij}$ is the $i^{th}$ row and $j^{th}$ column of A. Therefore, the signal vector produced by each of signal processor 703 may be a noisy, scaled version of $x_1$, where the scaling factor is $\|H^{(i)}\|_F^2$. Thus, signal processor 703 may remove any phase effects caused by the channel, leaving a processed signal that may only differ from the transmitted symbols in magnitude and additive noise. The processed received vector may then be written as, $$\tilde{y}^{(i)} = \|H^{(i)}\|_F^2 x_1 + \tilde{n}^{(i)} \tag{11}$$

The covariance of noise source, $\tilde{n}^{(i)} = H_{\text{eff}}^{(i)*} n^{(i)}$, may be given by, $$E\{\tilde{n}^{(i)} \tilde{n}^{(i)*}\} = E\{H_{\text{eff}}^{(i)*} n^{(i)} (H_{\text{eff}}^{(i)*} n^{(i)})^*\} \tag{12}$$

$$= \tilde{H}^{(i)} E\{n^{(i)} n^{(i)*}\} \tag{13}$$

$$= (\|H\|^2)_P N_0 I_2 \tag{14}$$

Therefore, the processed signal vector, $\tilde{y}^{(i)}$, is effectively a signal vector received from an AWGN channel, where the variance of the white noise is the variance of $n^{(i)}$ scaled by a factor.

The N processed signal vectors from processors 703 in FIG. 7A may be combined by adder 704. At the output of the adder, the combined signal vector is, $$\tilde{y} = \sum_{i=1}^{N} \tilde{y}^{(i)} = \sum_{i=1}^{N} H_{\text{eff}}^{(i)*} y^{(i)} \tag{15}$$

$$= \sum_{i=1}^{N} \{H_{\text{eff}}^{(i)*} H_{\text{eff}}^{(i)} x_1 + H_{\text{eff}}^{(i)*} n^{(i)}\} \tag{16}$$

$$= \sum_{i=1}^{N} \{\|H^{(i)}\|_F^2 x_1 + \tilde{n}^{(i)}\} \tag{17}$$

$$= \sum_{i=1}^{N} \{\|H^{(i)}\|_F^2\} x_1 + \tilde{n}. \tag{18}$$

As is the case with each individual $\tilde{y}^{(i)}$, the combined signal vector $\tilde{y}$ may also be treated as a received signal vector attenuated or amplified by the combined channel response matrix $\tilde{H}=\Sigma_{i=1}^{N}\|H^{(i)}\|_F^2$, and affected by combined additive white noise sources $\tilde{n}$. The covariance of combined noise sources, $E\{\tilde{n}\tilde{n}^*\}=\{\Sigma_{i=1}^{N}\|H^{(i)}\|_F^2\}N_0I_2$, is the sum of the N individual noise variances.

The combined signal vector, $\tilde{y}$, may be decoded using maximum-likelihood decoder (ML) decoder 706. ML decoder 706 may pick the transmit symbols, $\hat{x}_1$ and $\hat{x}_2$, that have the highest probability of being the correct transmit symbols. Decoder 706 may return soft information or hard information. If decoder 706 returns hard information, it may have been the result of hard-decoding or mapping from soft-decoding. For a coded system, decoder 706 may return coded information or decoded information.

Because $\tilde{y}$ is effectively a signal vector that was received from an AWGN channel, ML decoder 706 may choose valid transmit symbols, $\hat{x}_1$ and $\hat{x}_2$, that are closest to combined symbols $\tilde{y}_1$ and $\tilde{y}_2$ of $\tilde{y}$, respectively. That is, ML decoder 706 may choose symbols such that the noise, $\tilde{n}$, is minimized. In order to determine which symbol minimizes the noise, ML decoder 706 may need to use information about the channel characteristics. In particular, as shown in equation (18) above, the combined signal vector provided to ML decoder 706 may be the transmitted signal vector attenuated or amplified by the combined channel response matrix. For proper decoding, ML decoder 706 may need the degree of attenuation or amplification as a result of transmission and processing.

Figure 8A:
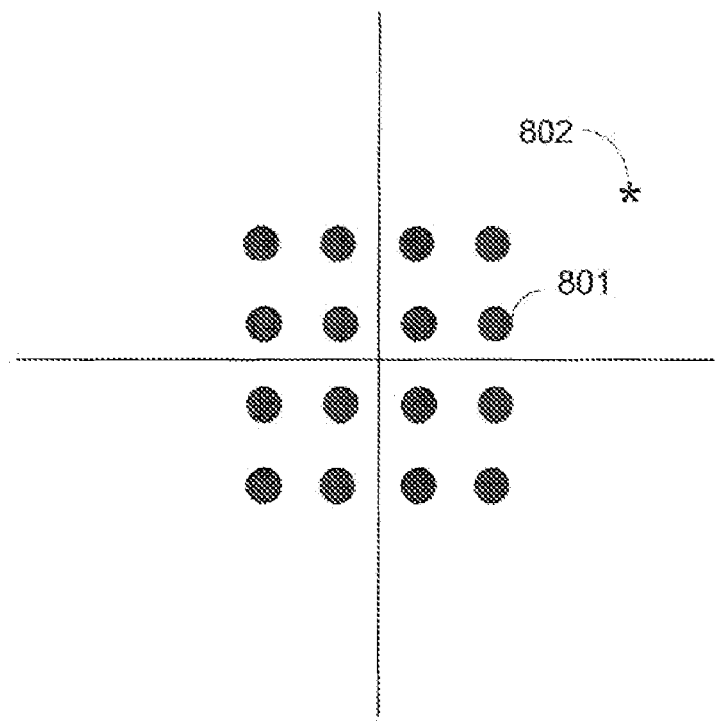
FIGS. 8A and 8B are 16-QAM signal constellation sets used to illustrate ML decoding.
Figure 8B:
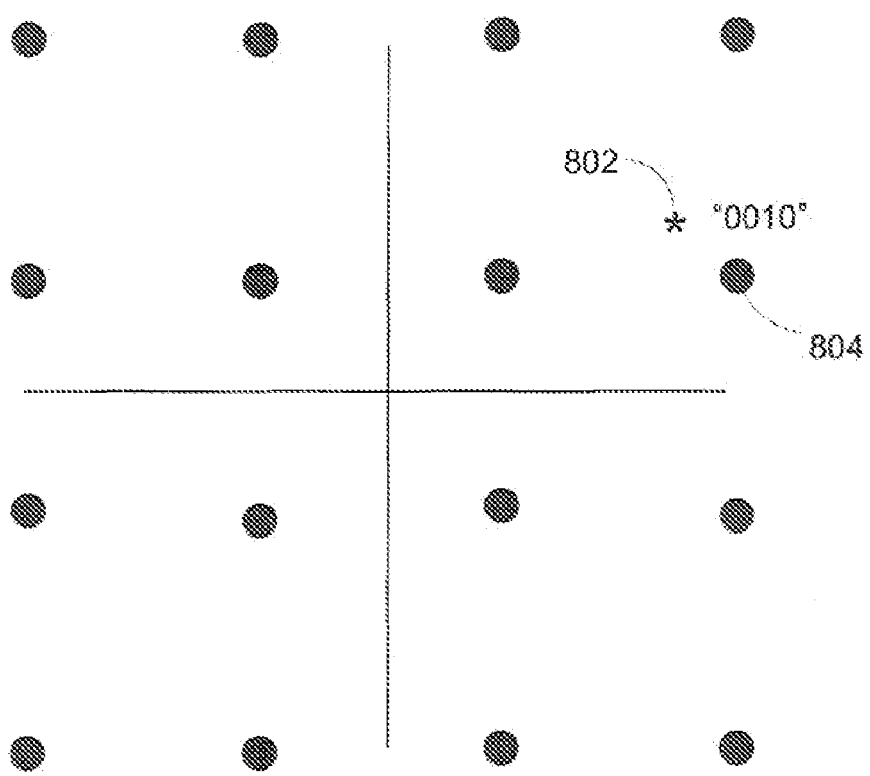

FIGS. 8A and 8B illustrate how this channel information may be necessary in order for decoder 706 to make a proper determination. FIGS. 8A and 8B show 16-QAM constellation sets, which were previously described in connection with FIG. 4B. FIG. 8A shows the signal set used by a transmitter (e.g., transmitter 102) to transmit a symbol sequence as signals. Assume for the purpose of illustration that, for one of the transmitted symbols, a signal with the magnitude and phase of signal point 801 is transmitted. This corresponds to symbol "0010." If the combined channel response matrix is were the identity matrix, ML decoder 706 could compare the magnitudes and phases of $\tilde{y}_1$ and $\tilde{y}_2$ directly to the signal set of FIG. 8A. However, this is generally not the case. FIG. 8B shows a new constellation set that has been scaled to correspond to the illustrative amplification of the transmitted signal. Now, if the combined signal corresponds to signal point 802, it may be decoded correctly as "0010."This is the symbol that minimizes the distance, or the noise, between the signal point of the combined symbol (802) and a signal point in the signal constellation set (804).

Therefore, referring back to FIG. 7A, ML decoder 706 may need information about the channel, and in particular the value of $\tilde{H}$, to properly decode for $x_1$. To determine the value that minimizes the noise, ML decoder 706 may compute the distance from $$z = \begin{bmatrix} \tilde{y}_1 \\ \tilde{y}_2 \end{bmatrix}$$

to each valid $\hat{x}$, where the distance may be expressed as $\|z-\tilde{H}\hat{x}\|^2$. ML decoder 706 may output $\hat{x}$, or the bit sequence corresponding to $x_1$, that minimizes $\|z-\tilde{H}\hat{x}\|^2$. In other embodiments, ML decoder 706 may compute soft information in the form of LLRs using the metric, $\|z-\tilde{H}\hat{x}\|^2$, and may output the LLR for each bit in the bit sequence.

ML decoder 706 may obtain any necessary channel information, such as the value of $\tilde{H}$, from channel preprocessor 708. Channel preprocessor 708 may compute $\tilde{H}=\Sigma_{i=1}^{N}\|H^{(i)}\|_F^2$ from the N channel response matrices. In addition, preprocessor 708 may calculate any other suitable information for use by signal processors 703 and/or decoder 706 that may be derived from the individual channel response matrices.

Receiver 700 of FIG. 7A illustrates a combining technique that maximizes signal-to-noise ratio (SNR). A combining scheme that maximizes this metric will hereinafter be referred to as a maximal-ratio combining (MRC) scheme. Signal processors 703 and adder 704, collectively referred to as combiner 710, is a maximal-ratio combiner. In particular, by weighting each signal vector by the inverse of its effective channel matrix, combiner 710 produces a combined signal vector having maximal SNR.

It should be understood that MRC is only one form of combining that may be implemented by receiver 700. In other embodiments, receiver 700 may implement other symbol-level combining schemes, such as concatenated-assisted symbol-level combining (CASLC). To use CASLC, combiner 710 may be replaced with a combiner that concatenates the signal vectors obtained from Alamouti processors 702, producing a signal vector, $$\tilde{y} = \begin{bmatrix} y^{(i)} \\ \vdots \\ y^{(N)} \end{bmatrix}, \quad (19)$$

and a signal processor that reduces the size of the concatenated signal vector. CASLC schemes, their features, and various implementation, are described in greater detail in U.S. patent application Ser. Nos. 11/724,882, filed Mar. 16, 2007 and 11/839,004, filed Aug. 15, 2007, which are hereby incorporated herein by reference in their entirety.

The block diagram of receiver 700 shows one embodiment of a decoder and a channel preprocessor that can be implemented in a MIMO receiver. It should be understood, however, that the present invention may be used with any form of decoding. For example, to reduce the complexity of decoding, decoder 706 may be a linear decoder, such as a zero-forcing or minimum mean square error decoder. Accordingly, channel preprocessor 708 may perform any channel preprocessing functions that the particular implementation of decoder 706 may require.

In other embodiments, rather than changing the type decoder, decoding complexity may be reduced by processing a combined signal vector before maximum-likelihood decoding. The processing may considerably reduce the number of computations that need to be performed by the maximum-likelihood decoder. Therefore, even though an extra processing step is implemented, the complexity reduction of the decoder improves the overall complexity, speed, and/or power consumption of the receiver.

FIG. 7B shows an illustrative block diagram of receiver 750 that includes this extra processing step. Receiver 750 can have many of the components, features, and functionalities of receiver 750, and includes channel preprocessor 752, signal processor 754, and ML decoder 756. Channel preprocessor 752 may compute a Cholesky factorization of the combined channel response matrix, which produces, $$\tilde{H}=LL^*, \quad (19)$$

where L is a lower triangular matrix and L* is its complex conjugate. Channel preprocessor may also compute the inverse of the lower triangular matrix for use by signal processor 754.

Signal processor 754 produces a processed combined signal vector that can be decoded by a lower-complexity decoder than the decoder for an unprocessed combined signal vector (e.g., decoder 706 of FIG. 7A). Signal processor 754 multiplies the combined signal vector by the channel information obtained from channel preprocessor 752. Mathematically, signal processor 754 computes, $$L^{-1}\tilde{y}_N = L^{-1}LL^*x_1 + L^{-1}\tilde{n} \quad (20)$$

$$= L^*x_1 + n', \quad (21)$$

where the resulting noise vector, n', is still white. The processed combined signal vector may be provided to ML decoder 756. Decoder 756 may compute $\|L^{-1}\tilde{y}_N - L^*x\|^2$ for each possible value, x, of the transmitted symbols. Because L* is a triangular matrix and has many zero components, the number of computations in the matrix multiplication for each possible value of x can be significantly reduced.

The receivers illustrated in FIGS. 7A and 7B show N Alamouti processors and corresponding signal processors, and N signal vectors as inputs into these Alamouti processors. However, not all N signal vectors are necessarily provided to the receiver at the same time, and the receiver is not required to wait until after all N signal vectors are received to begin operating. Instead, the receivers shown in FIGS. 7A and 7B is intended to illustrate that the system is capable of combining information from all N pairs of transmitted signal vectors. In fact, in some embodiments, such as when a HARQ protocol is used, as few as one Alamouti processor and signal processor may be implemented, and information on the previous transmissions may be obtained from another source.

FIG. 9 shows a receiver having a similar configuration as that of FIG. 7A, but with storage systems 910 and 912 for storing information on previously received signals. Storage systems 910 and 912 may be storage systems of any suitable type, such as RAM, ROM, or FLASH memory. In some embodiments, receiver 900 may instead resemble receiver 750 of FIG. 7B. Receiver 900 may receive the N pairs of signals or signal vectors in groups of P pairs, where $1 \leq P \leq N$. The variable P is hereinafter defined to be the number of pairs of symbols that are received within a certain time interval. Thus, for a HARQ or ARQ protocol, P may be equal to one. For repetition coding or another suitable fixed transmission scheme, P may be equal to N. For other suitable protocols, $1 < P < N$. For simplicity, it is assumed that P is divisible by N. In this scenario, there are a total of N/P transmissions of P pairs of symbols. The present invention, however, is not limited to this constrained situation. Also, for clarity, subscripts on any combined vectors or matrices will refer to the number of vectors or matrices included in the combination. For example, $\tilde{y}_i$ may refer to a combined vector for a combination of vectors $y_1, \ldots, y_i$ or $y_{i+1}, \ldots, y_{2i}$, etc.

When a first set of P pairs of symbols are received, they are processed by the P processors 902 and 903, and combined by adder 904 to obtain combined vector $\tilde{y}_P$. The value of $\tilde{y}_P$ may be stored in storage 910 for future use. $\tilde{y}_P$ may then be decoded by ML decoder 906 to obtain an estimate, $\hat{x}$, based on the information in the P pairs of symbols. ML decoder 906 decodes $\tilde{y}_P$ using channel information provided by preprocessor 908, where the channel information is obtained from processing the channel information associated with $\tilde{y}_P$. In particular, preprocessor 908 may calculate $\tilde{H} = \Sigma_{i=1}^{P}\|H^{(i)}\|_F^2$. The value of $\tilde{H} = \Sigma_{i=1}^{P}\|H^{(i)}\|_F^2$ may be stored in storage 912 for future use. Although storage 910 and 912 are shown to be separate in FIG. 9, they may also be a single storage system.

When a second set of P pairs of symbols are received, processors 902 and 903 may process these newly received symbols in substantially the same way as the previous P pairs. The P newly processed vectors, $\tilde{y}^{(1)}, \ldots, \tilde{y}^{(P)}$, may be combined by adder 904 along with information in storage 910 corresponding to the combined vector, $\tilde{y}_P$, of the first P pairs of symbols. Adder 904 produces $\tilde{y}_{2P}$, which includes information about the first 2P pairs of received symbols. Receiver 900 may store $\tilde{y}_{2P}$ in storage 910 by overwriting the previously stored information. Following the addition operation performed by adder 904, ML decoder 906 may decode the combined vector $\tilde{y}_{2P}$, producing a new estimate of the transmitted symbols. To decode the combined vector, ML decoder 906 may use channel information obtained from channel preprocessor 908 and storage 912.

Preprocessor 908 may compute combined channel response matrix $\tilde{H}_P = \Sigma_{i=1}^{P}\|H^{(i)}\|_F^2$ using the channel response matrices corresponding to the P pairs of newly received symbols. This matrix is combined with the combined channel information for the first P pairs of received symbols stored in storage 912. Therefore, the channel information provided to ML decoder 906 includes information for all 2P channel response matrices. The combined channel information, $\tilde{H}_{2P}$, may be stored in storage 912 by overwriting the previously stored channel information. When a third set of P pairs of symbols are received, $\tilde{y}_{2P}$ and $\tilde{H}_{2P}$ stored in storage 910 and 912 may be utilized in a similar manner.

Using the storage systems shown in FIG. 9, a receiver may incrementally change its combined received vector and combined channel matrix as new sets of symbols are received. After each set of P pairs of symbols is received, ML decoder 906 may produce an accurate estimate of the common transmit signal vector for the given number symbols that have been received. Thus, the effectiveness of the receiver may not depend on the number of received pairs of symbols. This is particularly useful for certain transmission protocols, such as HARQ, where he number of received signal vectors may vary.

Another benefit illustrated by receiver 900 of FIG. 9, and may be true of any other embodiment of the present invention (e.g., FIGS. 7A and 7B), is decoder reusability for an arbitrary N. That is, only one decoder is implemented no matter how many symbols are received. Using a separate decoder for each N would drastically increase both the amount and complexity of the hardware. In addition, since it would be impractical and impossible to implement a different decoder for all $N \geq 1$, the decoding flexibility of the receiver would otherwise be limited.

Another benefit of the receiver configuration in FIG. 9 is memory efficiency. After each set of P pairs of symbols is received, a new combined signal vector, $\tilde{y}$, is calculated. This signal vector may replace the previous information stored in memory. Therefore, the memory requirement of storage 910 and 912 does not depend on the number of received vectors. In particular, storage 910 may be just large enough to store one copy of $\tilde{y}$, and storage 912 may be just large enough to store one copy of $\tilde{y}$. This is in contrast to a system that re-computes $\tilde{y}$ and $\tilde{H}$ each time a new set of vectors is received. In this scenario, the receiver would need to save the symbols and channel information for all previous transmissions.

The embodiments thus far have been described for a transmitter and receiver that utilize transmit diversity. Therefore, overall, the MIMO system transfers one symbol of information during each symbol period. This type of transmission scheme may result in a lower data rate than when a spatial multiplexing scheme is used. A transmitter implementing spatial multiplexing transmits different information at each output. Thus, the MIMO system would be capable of transferring $N_t$ symbols at each symbol period. A MIMO system that uses a spatial multiplexing scheme and can combine symbols from multiple transmissions of a signal vector is described in U.S. patent application Ser. No. 11/781,208, which is hereby incorporated herein by reference in its entirety.

In some embodiments, to utilize the advantages of spatial multiplexing (e.g., high data rate) the transmitter and receiver may be configured to communicate using either spatial multiplexing or transmit diversity. The transmitter and receiver may determine which transmission scheme to use at any given time. The transmission scheme used by depend on the quality of the channel. A spatial multiplexing scheme may be used when the channel quality is high, while a transmit diversity scheme may be used when the channel quality is low. In some embodiments, the transmitter and receiver may determine whether the channel quality is high or low depending on the number of retransmissions necessary for the receiver to accept a set of information. In other embodiments, the receiver may request that a particular scheme be used. For example, the receiver may compute a performance metric (e.g., bit error rate) associated with the decoding performance of its decoder, and can determine whether the performance metric is above or below a certain threshold. If the performance metric is below the threshold, the receiver may conclude that the channel quality is low, and may send a request that the transmit diversity scheme be used. If, on the other hand, the performance metric is greater than the threshold, the receiver may conclude that the channel quality is high, and may send a request the spatial multiplexing scheme be used.

In other embodiments, the transmitter and receiver may agree upon a particular pattern between an Alamouti scheme and the spatial multiplexing scheme without using a feedback mechanism. For example, the transmitter may initially transmit a set of digital information using an Alamouti scheme, and may use a spatial multiplexing scheme for all retransmissions. More generally, the transmitter may transmit the same set of information a predetermined number of times using either the Alamouti scheme or a spatial multiplexing scheme before switching transmission schemes. In other embodiments, the transmitter may alternate between the two schemes using a predetermined pattern. Thus, it should be understood that, as long as the transmitter and receiver are coordinated, any suitable pattern or selection mechanism may be used to set the transmission scheme.

Figure 10:
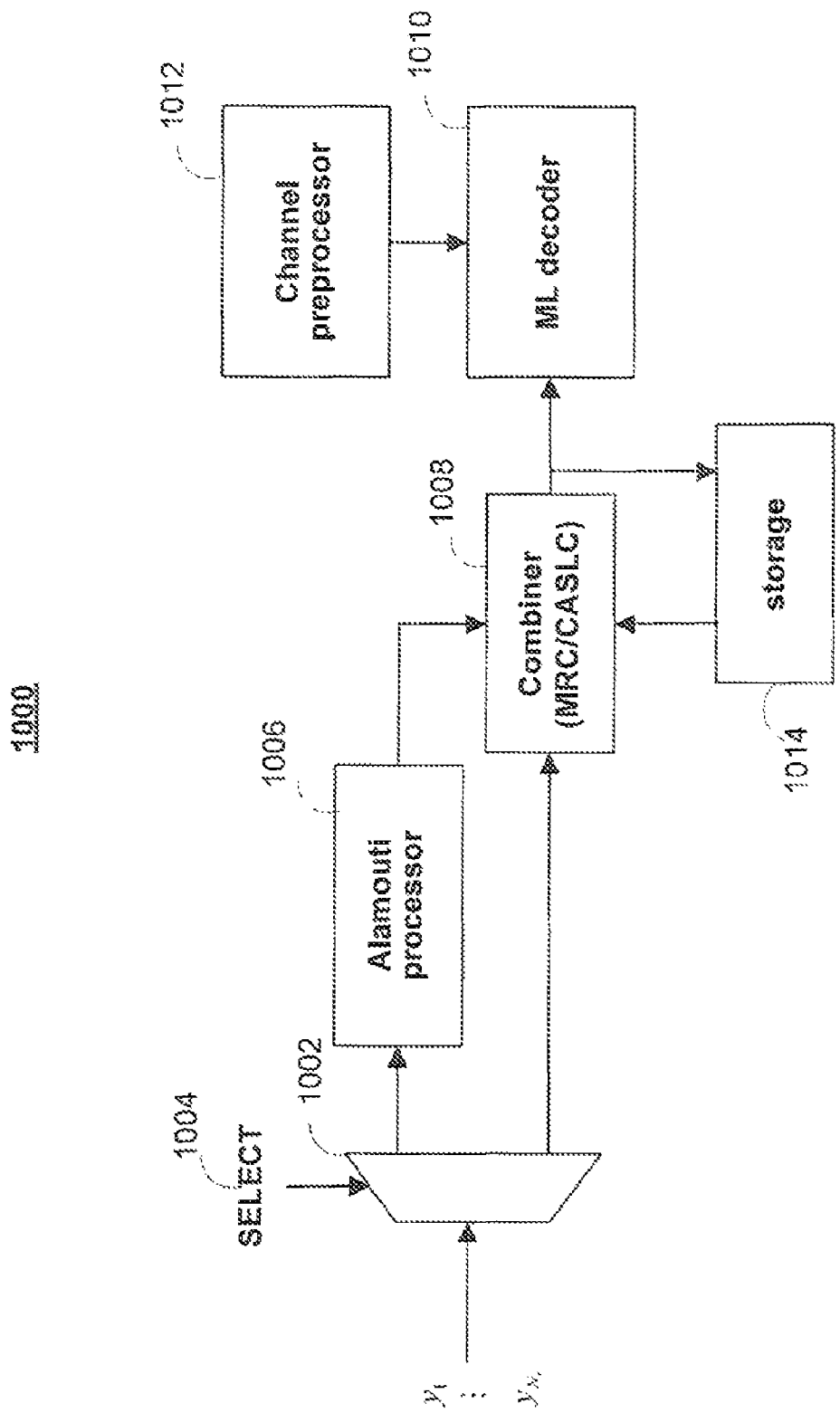
FIG. 10 is a block diagram of a receiver that utilizes transmit diversity and spatial multiplexing.

Receiver 1000 of FIG. 10 illustrates a MIMO receiver that is capable of decoding information using either a spatial multiplexing or an Alamouti transmission scheme. Receiver 1000 is shown to receive one signal vector at a time, and is therefore configured for sequential processing of received signal vectors. As illustrated in FIG. 10, receiver 1000 can include multiplexer 1002, Alamouti processor 1006, combiner 1008, ML decoder 1010, channel preprocessor 1012, and storage 1014.

Receiver 1000 may be configured such that, when transmit diversity is enabled, received signal vectors are passed to Alamouti processor 1006 for processing, and when spatial multiplexing is enabled, Alamouti processor 1006 is bypassed. Multiplexer 1002, acting under the control of SELECT signal 1004, routes received signal vectors to either processor 1006 or combiner 1008. SELECT signal 1004 may be derived from any suitable source, such as a processor (e.g., microprocessor, CPU), a storage system that stores settings of receiver 1000, or the output of combinational logic. For example, SELECT signal 1004 may be coupled to combinational logic that is configured to determine whether a predetermined number of retransmissions have been requested. In this example, multiplexer 1002 can route a received signal vector to either Alamouti processor 1006 or combiner 1008 depending on whether the predetermined number of retransmissions has been requested.

Alamouti processor 1006 includes any hardware (e.g., circuitry, logic components, storage) or software for generating an enhanced signal vector based on signal vectors received from two symbol periods. For example, for a two-input receiver, Alamouti processor 1006 produces a signal vector, $$y^{(i)} = \begin{bmatrix} y_1^{(i)} \\ y_2^{(i)} \\ y_3^{(i)*} \\ y_4^{(i)*} \end{bmatrix}, \quad (22)$$

for the ith pair of received signal vectors. Alamouti processor 1006 may compute the signal vector of equation (22) by concatenating the signal vector, $$y_1^{(i)} = \begin{bmatrix} y_1^{(i)} \\ y_2^{(i)} \end{bmatrix},$$

received in the first symbol period with the inverse of the signal vector, $$y_2^{(i)} = \begin{bmatrix} y_3^{(i)} \\ y_4^{(i)} \end{bmatrix},$$

received in the second symbol period. The effective channel matrix for the concatenated signal vector is given by, $$H_{eff}^{(i)} = \begin{bmatrix} h_{11}^{(i)} & h_{12}^{(i)} \\ h_{21}^{(i)} & h_{22}^{(i)} \\ h_{12}^{(i)*} & -h_{11}^{(i)*} \\ h_{22}^{(i)*} & -h_{21}^{(i)*} \end{bmatrix}. \quad (23)$$

When Alamouti processor 1006 is bypassed, the received signal vector for the two-input MIMO receiver can be represented as, $$y^{(i)} = \begin{bmatrix} y_1^{(i)} \\ y_2^{(i)} \end{bmatrix}, \quad (24)$$

where the effective channel matrix is, $$H_{eff}^{(i)} = \begin{bmatrix} h_{11}^{(i)} & h_{12}^{(i)} \\ h_{21}^{(i)} & h_{22}^{(i)} \end{bmatrix}. \quad (25)$$

Therefore, the values and dimensions of the signal vector and effective channel matrix provided as inputs to combiner 1008 depends on whether a spatial multiplexing or transmit diversity scheme is used. In the first scenario, a two-dimensional signal vector corresponding to one transmission of two symbols is provided to combiner 1008. In the second scenario, a four-dimensional enhanced signal vector corresponding to two transmission of two symbols is provided to combiner 1008.

Combiner 1008 may combine the current signal vector, whether derived from Alamouti processor 1006 or multiplexer 1002, with previously received signal vectors. The information for previously received signal vectors may be obtained from storage 1014. Combiner 1008 may combine these signal vectors using either maximal-ratio combining or concatenation-assisted symbol-level combining described above. For example, if combiner 1008 implements MRC, combiner 1008 may include signal processors for performing the vector-matrix multiplication, $H_{\mathit{eff}}^{(i)*}y^{(i)}$. Combiner 1008 may include two of these processors—one for the four-dimensional signal vector produced by Alamouti processor 1006, and one for the two-dimensional signal vector derived from the receiver inputs. Both processors would produce a two-dimensional processed signal vector. Therefore, combiner 1008 may implement one two-input adder, or similar component, that is used regardless of whether transmit diversity, spatial multiplexing, or a combination of the two are selected by SELECT signal 1004. Any other symbol-level combining scheme other than MRC and CASCL may be contemplated.

With continuing reference to FIG. 10, ML decoder 1010 decodes the combined signal vector produced by combiner 1008. ML decoder 1010 may perform decoding based on channel information obtained from channel preprocessor 1012. ML decoder 1010 and channel preprocessor 1012 may have any of the features and functionalities of their corresponding components in FIGS. 7A, 7B and 9 above. Although a storage system for storing intermediate values of channel information is not explicitly shown in FIG. 10, such a storage system may be implemented as part of channel preprocessor 1012.

Receiver 1000 illustrates a MIMO receiver that can process one signal vector at a time. In other embodiments, receiver 1000 may be altered to allow for parallel processing of multiple received signal vectors. For example, receiver 1000 may be altered to include multiple Alamouti processors 1006. Thus, it should be understood that protocols other than sequential processing protocols (e.g., HARQ) may be used, such as a repetition coding protocol.

FIGS. 7A, 7B, and 9, and FIG. 10 were described above for $N_r=1$ and $N_r=2$, respectively. However, the processing, combining, and decoding technique illustrated in these figures may be extended for any number of receiver inputs. In particular, for FIGS. 7A, 7B, and 9, rather than receiving a first symbol during a first symbol period and a second symbol during a second symbol period, receivers 700, 750, and 900 may receive two signal vectors each of size $N_r \times 1$. Thus, Alamouti processors 702, 902, and 1006 (FIGS. 7A, 9, and 10), may produce signal vectors of size $2N_r \times 1$ given by, $$y = \begin{bmatrix} y_1 \\ y_2^* \end{bmatrix} = \begin{bmatrix} \begin{bmatrix} y_1 \\ \vdots \\ y_{N_r} \end{bmatrix}_1 \\ \begin{bmatrix} y_1 \\ \vdots \\ y_{N_r} \end{bmatrix}_2^* \end{bmatrix} \begin{bmatrix} \begin{bmatrix} h_{11} & h_{12} \\ \vdots & \vdots \\ h_{N_r 1} & h_{N_r 2} \end{bmatrix} \\ \begin{bmatrix} h_{12}^* & -h_{11}^* \\ \vdots & \vdots \\ h_{N_r 2}^* & h_{N_r 1}^* \end{bmatrix} \end{bmatrix} \begin{bmatrix} x_1 \\ x_2 \end{bmatrix} + \begin{bmatrix} \begin{bmatrix} n_1 \\ \vdots \\ n_{N_r} \end{bmatrix}_1 \\ \begin{bmatrix} n_1 \\ \vdots \\ n_{N_r} \end{bmatrix}_2^* \end{bmatrix}. \quad (26)$$

The processing steps performed by each of the other components of receivers 700, 900, and 1000 may be adjusted accordingly to process the larger, $2N_r$-sized vectors. Furthermore, the size of storage 910 may be increased to accommodate the larger size of $\tilde{y}$.

Figure 11:
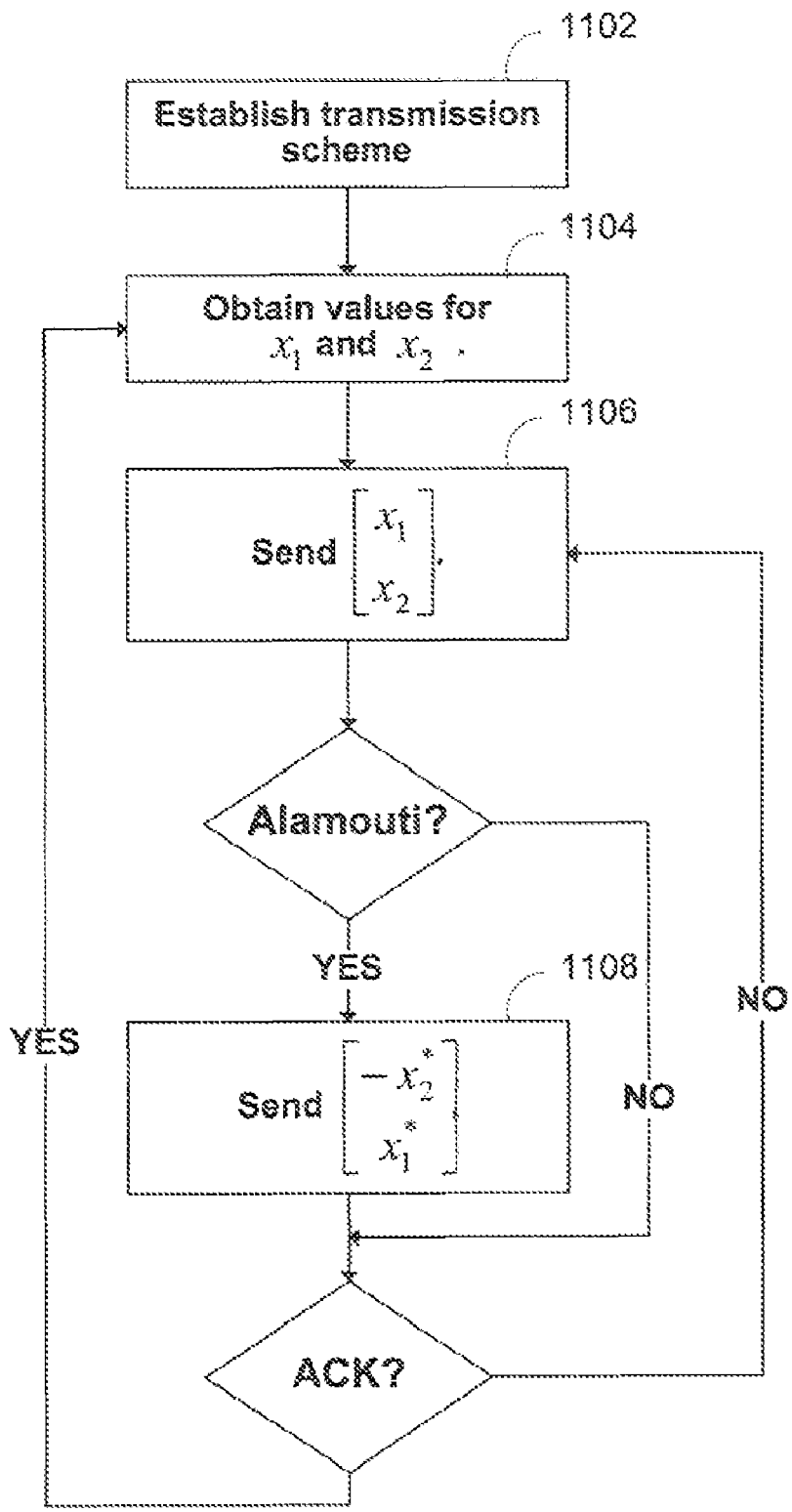
FIG. 11 is a flow chart of a stop-and-wait HARQ transmitter that uses transmit diversity and spatial multiplexing.
Figure 12:
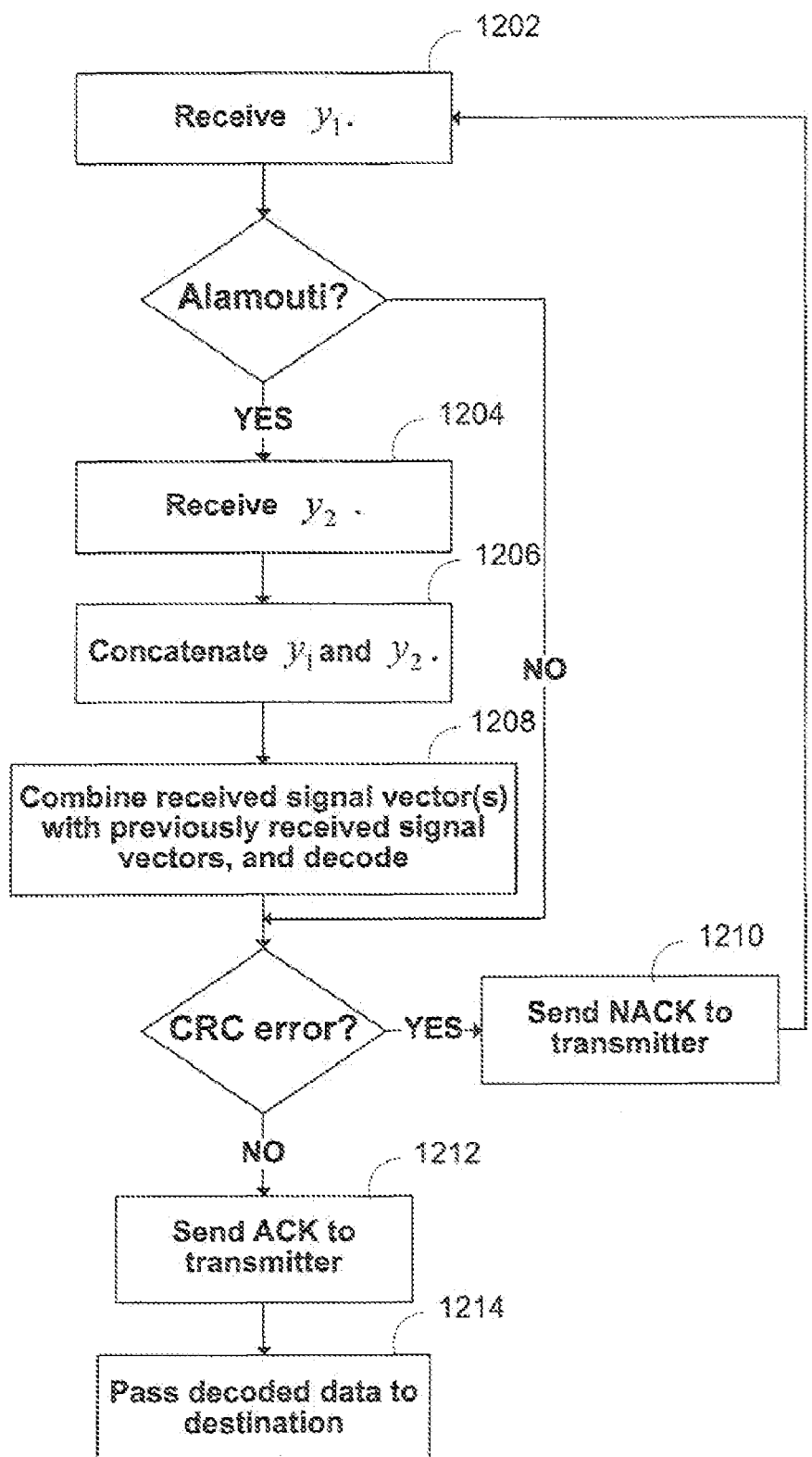
FIG. 12 is a flow chart of a HARQ receiver that uses transmit diversity and spatial multiplexing.

FIGS. 11 and 12 show flow charts of illustrative processes for transferring information using type-I HARQ and either a transmit diversity scheme or a spatial multiplexing scheme. In particular, the flow chart of FIG. 11 illustrates steps that may be taken by a stop-and-wait 2-input transmitter, and the flow chart of FIG. 12 illustrates steps that may be taken by a 2-input HARQ receiver.

The process of FIG. 11 for a transmitter (e.g., transmitter 102 of FIG. 3) begins at step 1102. At step 1102, a transmission scheme is established. The transmitter may determine whether to initially use an Alamouti transmission scheme or a spatial multiplexing scheme. The determination may be based on the expected quality of the channel. At step 1102, the transmitter may also determine under what condition to switch transmission schemes. For example, the transmitter may establish a pattern for switching between the two schemes (e.g., an alternating pattern) or a handshaking protocol with the receiver to obtain requests to change the transmission protocol.

At step 1104, the values of $x_1$ and $x_2$ may be obtained. These values may be derived from a digital information sequence that the transmitter is attempting to transmit to a receiver, and may be obtained from any suitable source. Then, at step 1106, the transmitter may transmit the obtained values via its two transmitter outputs. If the transmitter is set to use an Alamouti transmission scheme, at step 1108, the transmitter also sends the same two values at the next symbol period, except $-x_2^*$ and $x_1^*$ are transmitted instead. Because a stop-and-wait HARQ scheme is illustrated, the transmitter waits for either an ACK or NACK signal from the receiver before transmitting any further information. If an ACK is received, the transmitter assumes that the receiver has successfully received the two values, and the process of FIG. 11 returns to step 1104. At step 1104, new values for transmission are obtained, such as the next set of values in the digital information sequence. If a NACK is received instead, or if neither NACK or ACK are received, the process returns to step 1106. At step 1106, the transmitter retransmits the current values of $x_1$ and $x_2$. Thus, a transmitter that transmits information according to the steps of FIG. 11 can repeatedly transmit a set of symbols using either a transmit diversity or a spatial multiplexing scheme until the signals are successfully received by the receiver.

FIG. 12 shows the steps of an illustrative process that may be implemented by a two-input MIMO receiver. These steps may be performed by a MIMO receiver that uses a type-I HARQ transmission scheme, and is capable of receiving information using either an Alamouti scheme or a spatial multiplexing scheme. The process begins at step 1202. At step 1202, the receiver may receive a first signal or signal vector. If an Alamouti transmission scheme is being used, at step 1204, the receiver may also receive a second signal or signal vector corresponding to the same information in the next symbol period. Then, at step 1206, the first signal vector and the inverse of the second signal vector may be concatenated to form a new signal vector of twice the number of dimensions. The components of the concatenated, or enhanced, signal vector are shown in equation (22) above.

If instead a spatial multiplexing scheme is used, steps 1204 and 1206 may be bypassed, and the signal vector received at step 1202 may be used in the remaining steps of the flow chart. At step 1208, this signal vector (or, for an Alamouti transmission scheme, the concatenated signal vector produced in step 1206) may be combined with previously received signal vectors. The receiver may combine these signal vectors using maximal-ratio combining, concatenation-assisted symbol-level combining, or any other suitable symbol-level combining scheme. The combined signal vector is then decoded using, for example, maximum-likelihood decoding. After decoding, the receiver may determine whether an error is present in the decoded information. If an error is detected, the receiver may send a NACK to request a retransmission at step 1210. Then, the process may return to step 1202, and the receiver may receive the retransmission of the information. Otherwise, the receiver may send an ACK to the transmitter at step 1212 and may pass the decoded data to the destination at step 1214.

Thus, a receiver that performs the steps of FIG. 12 may receive as many signal vectors as needed to recover the transmitted information. Furthermore, the receiver can receive information using an Alamouti scheme, a spatial multiplexing scheme, or a combination of the two schemes.

Referring now to FIGS. 13A-13G, various exemplary implementations of the present invention are shown.

Figure 13A:
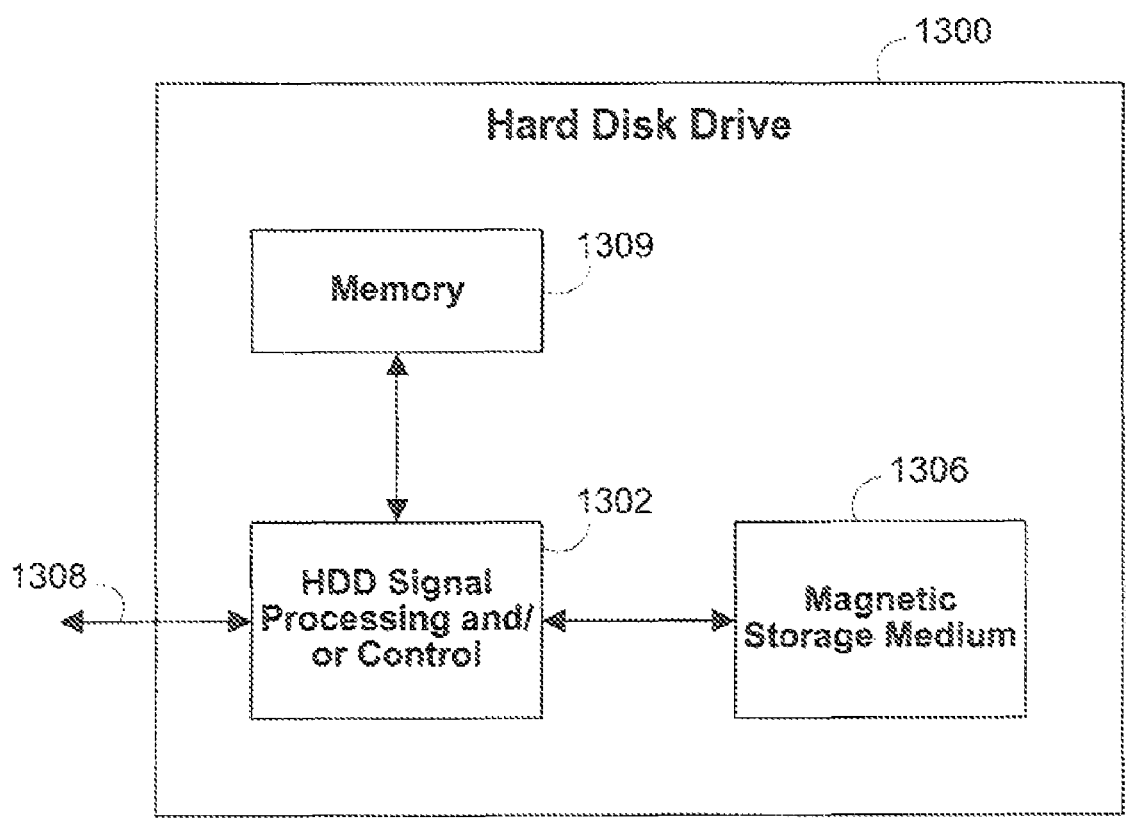
FIG. 13A is a block diagram of an exemplary hard disk drive that can employ the disclosed technology.

Referring now to FIG. 13A, the present invention can be implemented in a hard disk drive 1300. The present invention may implement either or both signal processing and/or control circuits, which are generally identified in FIG. 13A at 1302. In some implementations, the signal processing and/or control circuit 1302 and/or other circuits (not shown) in the HDD 1300 may process data, perform coding and/or encryption, perform calculations, and/or format data that is output to and/or received from a magnetic storage medium 1306.

The HDD 1300 may communicate with a host device (not shown) such as a computer, mobile computing devices such as personal digital assistants, cellular phones, media or MP3 players and the like, and/or other devices via one or more wired or wireless communication links 1308. The HDD 1300 may be connected to memory 1309 such as random access memory (RAM), low latency nonvolatile memory such as flash memory, read only memory (ROM) and/or other suitable electronic data storage.

Figure 13B:
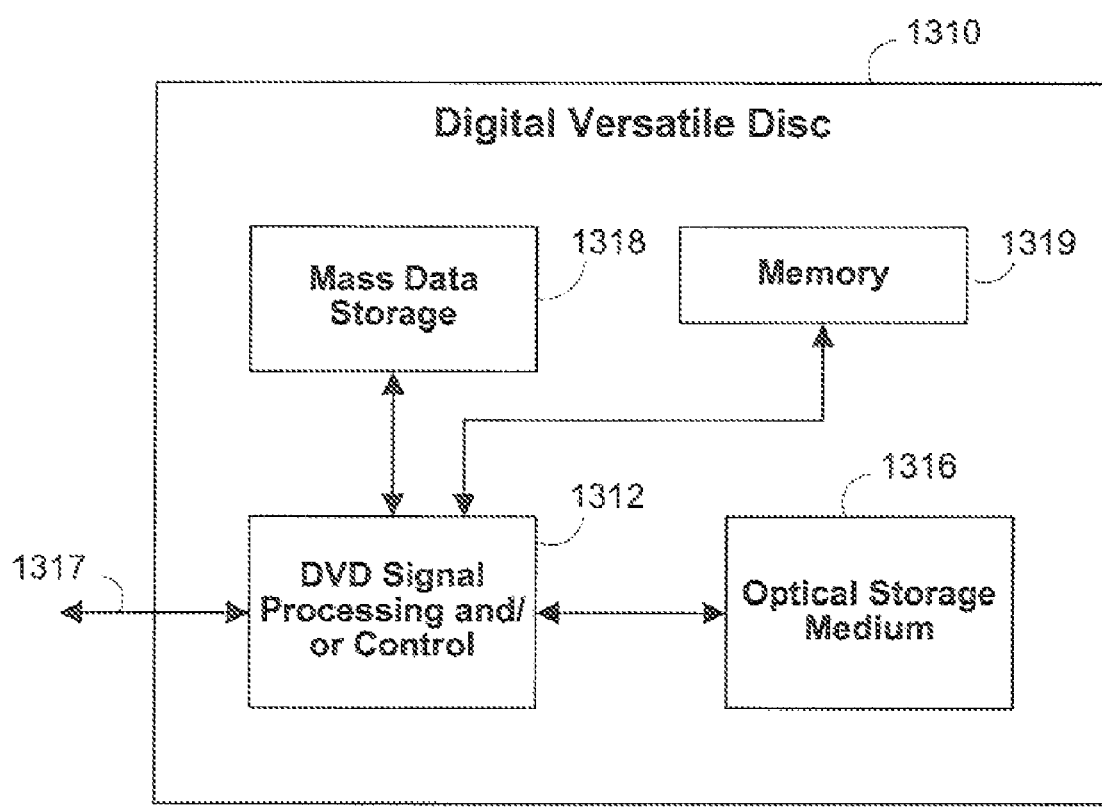
FIG. 13B is a block diagram of an exemplary digital versatile disc that can employ the disclosed technology.

Referring now to FIG. 13B, the present invention can be implemented in a digital versatile disc (DVD) drive 1310. The present invention may implement either or both signal processing and/or control circuits, which are generally identified in FIG. 13B at 1312, and/or mass data storage of the DVD drive 1310. The signal processing and/or control circuit 1312 and/or other circuits (not shown) in the DVD 1310 may process data, perform coding and/or encryption, perform calculations, and/or format data that is read from and/or data written to an optical storage medium 1316. In some implementations, the signal processing and/or control circuit 1312 and/or other circuits (not shown) in the DVD 1310 can also perform other functions such as encoding and/or decoding and/or any other signal processing functions associated with a DVD drive.

The DVD drive 1310 may communicate with an output device (not shown) such as a computer, television or other device via one or more wired or wireless communication links 1317. The DVD 1310 may communicate with mass data storage 1318 that stores data in a nonvolatile manner. The mass data storage 1318 may include a hard disk drive (HDD). The HDD may have the configuration shown in FIG. 13A. The HDD may be a mini HDD that includes one or more platters having a diameter that is smaller than approximately 1.8". The DVD 1310 may be connected to memory 1319 such as RAM, ROM, low latency nonvolatile memory such as flash memory and/or other suitable electronic data storage.

Figure 13C:
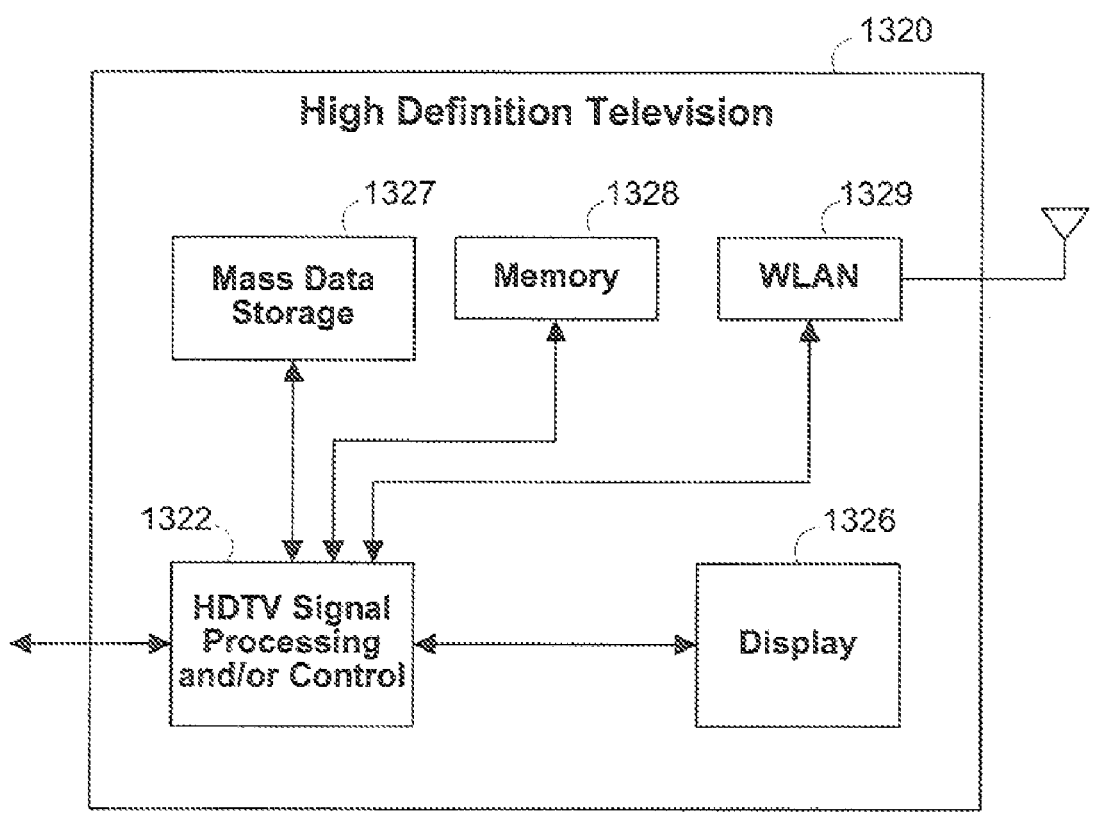
FIG. 13C is a block diagram of an exemplary high definition television that can employ the disclosed technology.

Referring now to FIG. 13C, the present invention can be implemented in a high definition television (HDTV) 1320. The present invention may implement either or both signal processing and/or control circuits, which are generally identified in FIG. 13C at 1322, a WLAN interface and/or mass data storage of the HDTV 1320. The HDTV 1320 receives HDTV input signals in either a wired or wireless format and generates HDTV output signals for a display 1326. In some implementations, signal processing circuit and/or control circuit 1322 and/or other circuits (not shown) of the HDTV 1320 may process data, perform coding and/or encryption, perform calculations, format data and/or perform any other type of HDTV processing that may be required.

The HDTV 1320 may communicate with mass data storage 1327 that stores data in a nonvolatile manner such as optical and/or magnetic storage devices for example hard disk drives HDD and/or DVDs. At least one HDD may have the configuration shown in FIG. 13A and/or at least one DVD may have the configuration shown in FIG. 13B. The HDD may be a mini HDD that includes one or more platters having a diameter that is smaller than approximately 1.8". The HDTV 1320 may be connected to memory 1328 such as RAM, ROM, low latency nonvolatile memory such as flash memory and/or other suitable electronic data storage. The HDTV 1320 also may support connections with a WLAN via a WLAN network interface 1329.

Figure 13D:
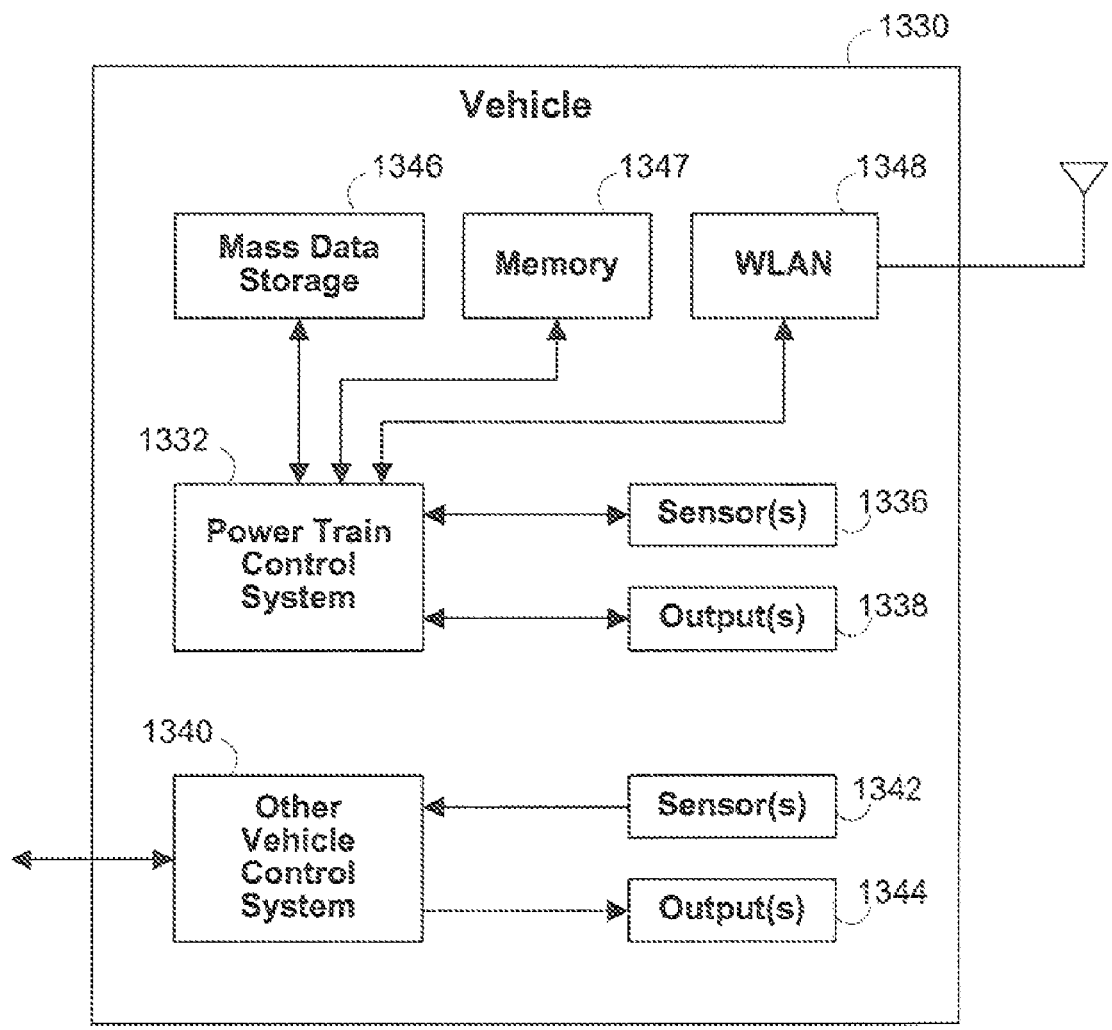
FIG. 13D is a block diagram of an exemplary vehicle that can employ the disclosed technology.

Referring now to FIG. 13D, the present invention implements a control system of a vehicle 1330, a WLAN interface and/or mass data storage of the vehicle control system. In some implementations, the present invention may implement a powertrain control system 1332 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1340 of the vehicle 1330. The control system 1340 may likewise receive signals from input sensors 1342 and/or output control signals to one or more output devices 1344. In some implementations, the control system 1340 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1332 may communicate with mass data storage 1346 that stores data in a nonvolatile manner. The mass data storage 1046 may include optical and/or magnetic storage devices for example hard disk drives HDD and/or DVDs. At least one HDD may have the configuration shown in FIG. 13A and/or at least one DVD may have the configuration shown in FIG. 13B. The HDD may be a mini HDD that includes one or more platters having a diameter that is smaller than approximately 1.8". The powertrain control system 1332 may be connected to memory 1347 such as RAM, ROM, low latency nonvolatile memory such as flash memory and/or other suitable electronic data storage. The powertrain control system 1332 also may support connections with a WLAN via a WLAN network interface 1348. The control system 1340 may also include mass data storage, memory and/or a WLAN interface (all not shown).

Figure 13E:
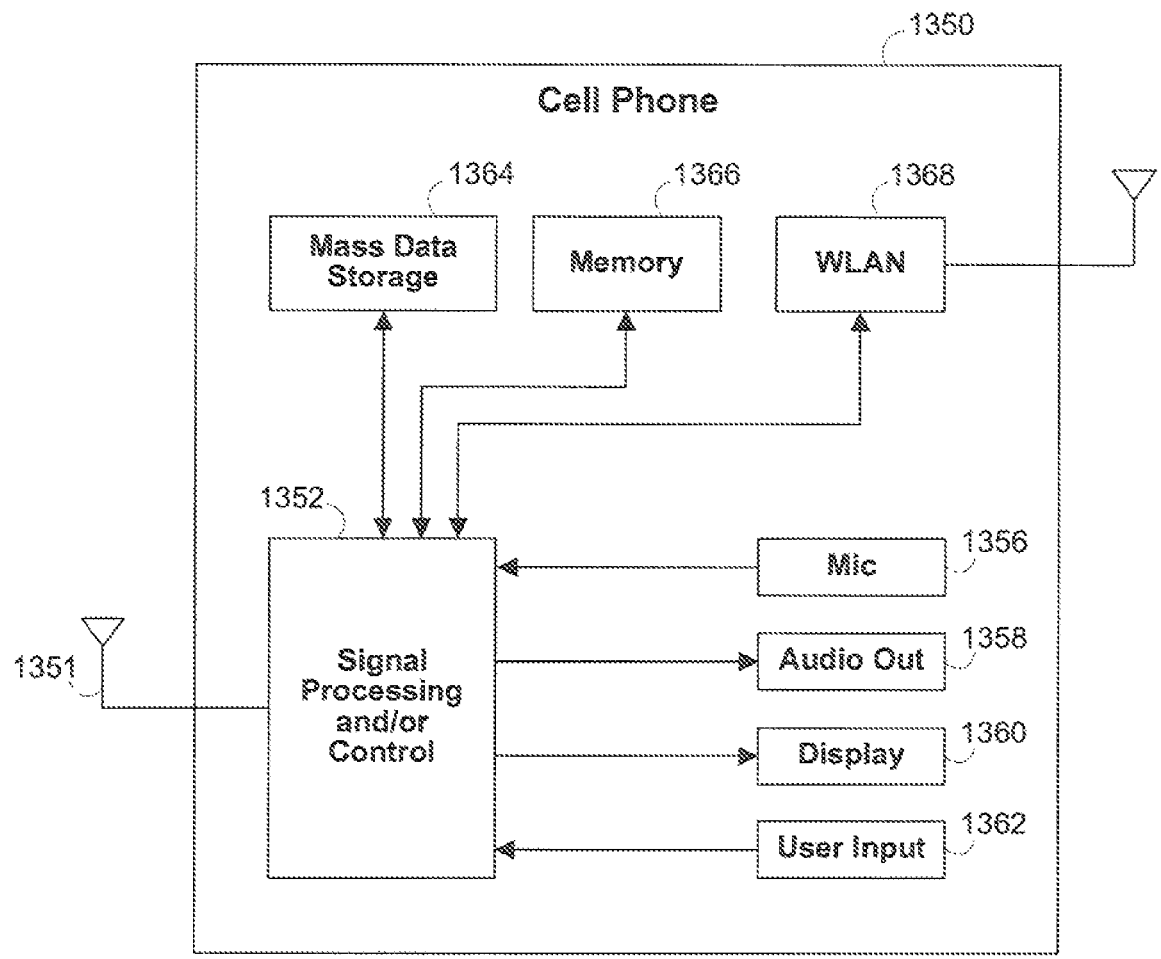
FIG. 13E is a block diagram of an exemplary cell phone that can employ the disclosed technology.

Referring now to FIG. 13E, the present invention can be implemented in a cellular phone 1350 that may include a cellular antenna 1351. The present invention may implement either or both signal processing and/or control circuits, which are generally identified in FIG. 13E at 1352, a WLAN interface and/or mass data storage of the cellular phone 1350. In some implementations, the cellular phone 1350 includes a microphone 1356, an audio output 1358 such as a speaker and/or audio output jack, a display 1360 and/or an input device 1362 such as a keypad, pointing device, voice actuation and/or other input device. The signal processing and/or control circuits 1352 and/or other circuits (not shown) in the cellular phone 1350 may process data, perform coding and/or encryption, perform calculations, format data and/or perform other cellular phone functions.

The cellular phone 1350 may communicate with mass data storage 1364 that stores data in a nonvolatile manner such as optical and/or magnetic storage devices for example hard disk drives HDD and/or DVDs. At least one HDD may have the configuration shown in FIG. 13A and/or at least one DVD may have the configuration shown in FIG. 13B. The HDD may be a mini HDD that includes one or more platters having a diameter that is smaller than approximately 1.8". The cellular phone 1350 may be connected to memory 1366 such as RAM, ROM, low latency nonvolatile memory such as flash memory and/or other suitable electronic data storage. The cellular phone 1350 also may support connections with a WLAN via a WLAN network interface 1368.

Figure 13F:
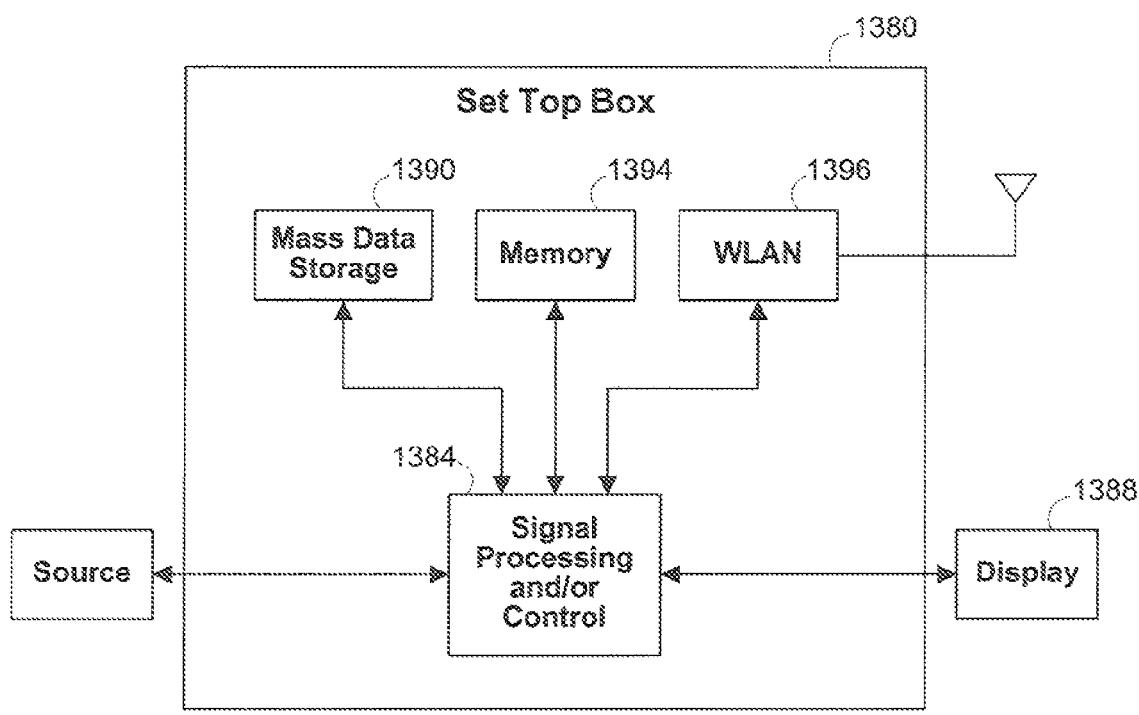
FIG. 13F is a block diagram of an exemplary set top box that can employ the disclosed technology.

Referring now to FIG. 13F, the present invention can be implemented in a set top box 1380. The present invention may implement either or both signal processing and/or control circuits, which are generally identified in FIG. 13F at 1384, a WLAN interface and/or mass data storage of the set top box 1380. The set top box 1380 receives signals from a source such as a broadband source and outputs standard and/or high definition audio/video signals suitable for a display 1388 such as a television and/or monitor and/or other video and/or audio output devices. The signal processing and/or control circuits 1384 and/or other circuits (not shown) of the set top box 1380 may process data, perform coding and/or encryption, perform calculations, format data and/or perform any other set top box function.

The set top box 1380 may communicate with mass data storage 1390 that stores data in a nonvolatile manner. The mass data storage 1390 may include optical and/or magnetic storage devices for example hard disk drives HDD and/or DVDs. At least one HDD may have the configuration shown in FIG. 13A and/or at least one DVD may have the configuration shown in FIG. 13B. The HDD may be a mini HDD that includes one or more platters having a diameter that is smaller than approximately 1.8". The set top box 1380 may be connected to memory 1394 such as RAM, ROM, low latency nonvolatile memory such as flash memory and/or other suitable electronic data storage. The set top box 1380 also may support connections with a WLAN via a WLAN network interface 1396.

Figure 13G:
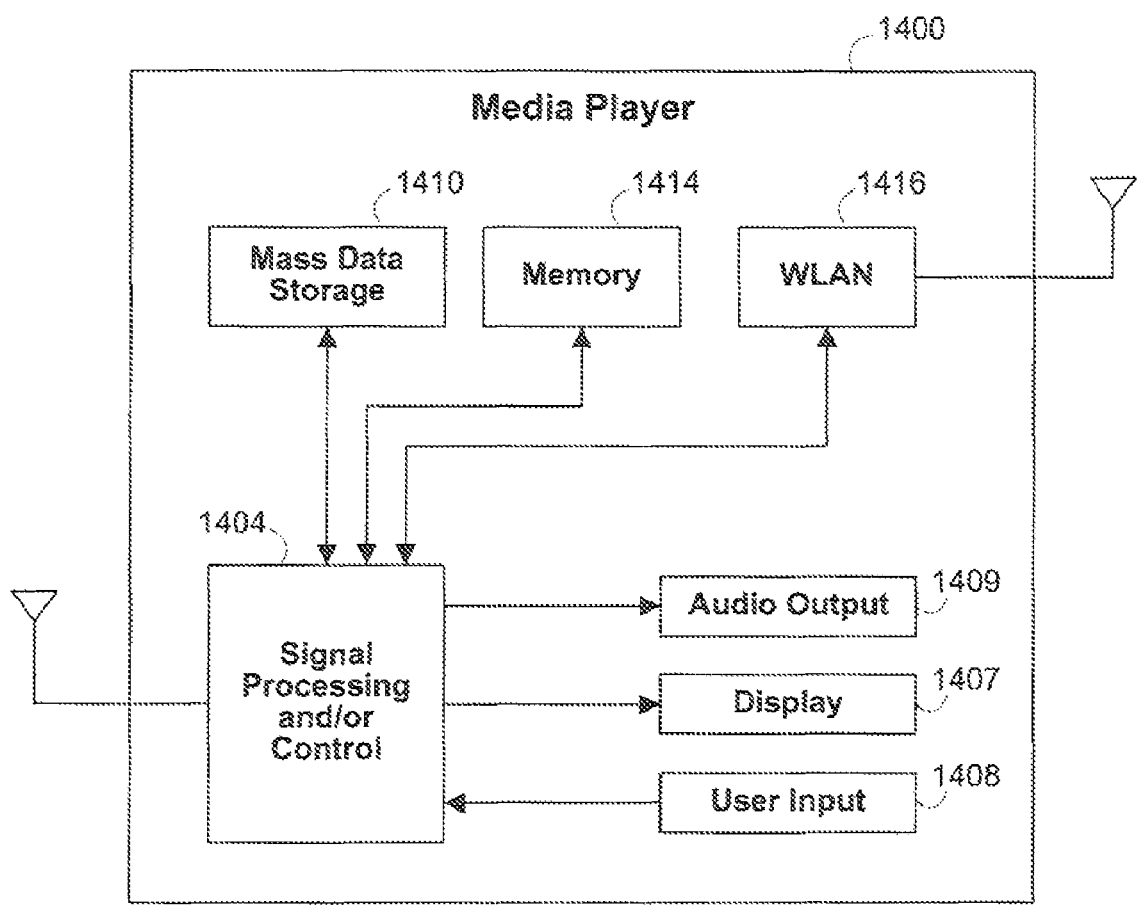
FIG. 13G is a block diagram of an exemplary media player that can employ the disclosed technology.

Referring now to FIG. 13G, the present invention can be implemented in a media player 1460. The present invention may implement either or both signal processing and/or control circuits, which are generally identified in FIG. 13G at 1404, a WLAN interface and/or mass data storage of the media player 1400. In some implementations, the media player 1400 includes a display 1407 and/or a user input 1408 such as a keypad, touchpad and the like. In some implementations, the media player 1400 may employ a graphical user interface (GUI) that typically employs menus, drop down menus, icons and/or a point-and-click interface via the display 1407 and/or user input 1408. The media player 1400 further includes an audio output 1409 such as a speaker and/or audio output jack. The signal processing and/or control circuits 1404 and/or other circuits (not shown) of the media player 1400 may process data, perform coding and/or encryption, perform calculations, format data and/or perform any other media player function.

The media player 1400 may communicate with mass data storage 1410 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 13A and/or at least one DVD may have the configuration shown in FIG. 13B. The HDD may be a mini HDD that includes one or more platters having a diameter that is smaller than approximately 1.8". The media player 1400 may be connected to memory 1414 such as RAM, ROM, low latency nonvolatile memory such as flash memory and/or other suitable electronic data storage. The media player 1400 also may support connections with a WLAN via a WLAN network interface 1416. Still other implementations in addition to those described above are contemplated.

The foregoing describes systems and methods for decoding a signal vector, where the receiver may obtain receive multiple instances of the same transmit signal vector. The above described embodiments of the present invention are presented for the purposes of illustration and not of limitation. Furthermore, the present invention is not limited to a particular implementation. The invention may be implemented in hardware, such as on an application specific integrated circuit (ASIC) or on a field-programmable gate array (FPGA). The invention may also be implement in software.

What is claimed is:

1. A method of decoding a signal vector in a transmit diversity scheme, comprising:
   receiving multiple sets of signals corresponding to common transmitted information, wherein each of the multiple sets of signals is associated with its own channel information and comprises signals associated with different symbol periods;
   processing each of the multiple sets of signals and its associated channel information to produce a plurality of signal vectors and a plurality of effective channel matrices;
   combining the signal vectors into a combined signal vector, wherein the combining comprises processing each of the signal vectors based on a corresponding one of the effective channel matrices;
   combining the effective channel matrices into a combined effective channel matrix; and
   decoding the combined signal vector using the combined effective channel matrix.

2. The method of claim 1, wherein the multiple sets of signals are received using a retransmission protocol.

3. The method of claim 2, wherein the retransmission protocol is a hybrid automatic repeat request (HARQ) protocol.

4. The method of claim 1, wherein receiving multiple sets of signals comprises receiving a fixed number of signals.

5. The method of claim 4, wherein the fixed number of signals are received using repetition coding.

6. The method of claim 1, wherein symbols of the multiple sets of signals correspond to a signal constellation set.

7. The method of claim 6, wherein the signal constellation set is based on quadrature amplitude modulation.

8. The method of claim 1, wherein the multiple sets of signals comprise one of uncoded and coded data.

9. The method of claim 1, wherein the transmit diversity scheme is an Alamouti transmission scheme.

10. The method of claim 9, wherein the common transmitted information is received in two symbol periods, wherein $x_1$ and $x_2$ are transmitted from a first and a second output of a transmitter in a first symbol period, respectively, and wherein $-x_2$, a negative complex conjugate of $x_2$, and $x_1^*$, a complex conjugate of $x_1$, are transmitted from the first and second outputs of the transmitter in a second symbol period, respectively.

11. The method of claim 10, wherein each of the plurality of signal vectors is represented as $$y = \begin{bmatrix} y_1 \\ y_2^* \end{bmatrix},$$

where $y_1$ is received in the first symbol period and $y_2$ is received in the second symbol period, and wherein $y_2^*$ is a complex conjugate of $y_2$.

12. The method of claim 1, wherein combining the signal vectors further comprises adding the processed signal vectors.

13. The method of claim 12, wherein processing each of the signal vectors comprises weighting each signal vector according to a conjugate transpose of the corresponding effective channel matrix.

14. The method of claim 13, wherein each of the effective channel matrices comprises $$\begin{bmatrix} h_1 & h_2 \\ h_2^* & -h_1^* \end{bmatrix},$$

wherein $-h_1^*$ is a negative complex conjugate of $h_1$ and $h_2^*$ is a complex conjugate of $h_2$.

15. The method of claim 1, further comprising processing the sets of signals to reduce phase rotation caused by a channel.

16. The method of claim 1, wherein processing each of the multiple sets of signals comprises concatenating the signals within each set of signals into a single vector.

17. The method of claim 1, wherein decoding comprises maximum-likelihood decoding.

18. The method of claim 1, further comprising preprocessing the channel information associated with each of the multiple sets of signals.

19. The method of claim 1, wherein processing each of the signal vectors comprises computing the Frobenius norm of a corresponding one of the effective channel response matrices.

20. The method of claim 1, wherein decoding comprises computing a Cholesky factorization of the combined effective channel matrix.

21. The method of claim 20, wherein the Cholesky factorization produces a triangular matrix, L, and wherein decoding further comprises calculating $\|L^{-1}\tilde{y}_N - L^*x\|^2$, where $\tilde{y}_N$ is the combined signal vector and x is a possible value of the common transmitted information.

22. The method of claim 1, wherein the multiple sets of signals are received within distinct time intervals, and wherein combining the signal vectors comprises combining the signal vectors from the same time interval.

23. The method of claim 22, wherein the combined signal vector is a first combined signal vector corresponding to signals received in a first time interval, the method further comprising:

storing the first combined signal vector; and combining signal vectors produced from signals received in a second time interval with the stored first combined signal vector to form a second combined signal vector.

24. The method of claim 23, further comprising storing the second combined signal vector by overwriting the first combined signal vector.

25. The method of claim 22, further comprising preprocessing channel information associated with signals received in the same time interval.

26. The method of claim 25, further comprising:

storing first preprocessed channel information corresponding to signals received in a first time interval; and combining preprocessed channel information corresponding to signals received in a second time interval with the stored first preprocessed channel information to form second preprocessed channel information.

27. The method of claim 26, further comprising storing the second preprocessed channel information by overwriting the first preprocessed channel information.

28. A system for decoding a signal vector in a transmit diversity scheme, comprising:

means for receiving multiple sets of signals corresponding to common transmitted information, wherein each of the multiple sets of signals is associated with its own channel information and comprises signals associated with different symbol periods;

means for processing each of the multiple sets of signals and its associated channel information to produce a plurality of signal vectors and a plurality of effective channel matrices;

means for combining the signal vectors into a combined signal vector, wherein the means for combining comprises means for processing each of the signal vectors based on a corresponding one of the effective channel matrices;

means for combining the effective channel matrices into a combined effective channel matrix; and means for decoding the combined signal vector using the combined effective channel matrix.

29. The system of claim 28, wherein the multiple sets of signals are received using a retransmission protocol.

30. The system of claim 29, wherein the retransmission protocol is a hybrid automatic repeat request (HARQ) protocol.

31. The system of claim 28, wherein the means for receiving multiple sets of signals comprises means for receiving a fixed number of signals.

32. The system of claim 31, wherein the fixed number of signals are received using repetition coding.

33. The system of claim 28, wherein symbols of the multiple sets of signals correspond to a signal constellation set.

34. The system of claim 33, wherein the signal constellation set is based on quadrature amplitude modulation.

35. The system of claim 28, wherein the multiple sets of signals comprise one of uncoded and coded data.

36. The system of claim 28, wherein the transmit diversity scheme is an Alamouti transmission scheme.

37. The system of claim 36, wherein the common transmitted information is received in two symbol periods, wherein $x_1$ and $x_2$ are transmitted from a first and a second output of a transmitter in a first symbol period, respectively, and wherein $-x_2^*$, a negative complex conjugate of $x_2$, and $x_1^*$, a complex conjugate of $x_1$, are transmitted from the first and second outputs of the transmitter in a second symbol period, respectively.

38. The system of claim 37, wherein each of the plurality of signal vectors is represented as $$y = \begin{bmatrix} y_1 \\ y_2^* \end{bmatrix},$$

where $y_1$ is received in the first symbol period and $y_2$ is received in the second symbol period, and wherein $y_2^*$ is a complex conjugate of $y_2$.

39. The system of claim 28, wherein the means for combining the signal vectors further comprises means for adding the processed signal vectors.

40. The system of claim 39, wherein the means for processing each of the signal vectors comprises means for weighting each signal vector according to a conjugate transpose of the corresponding effective channel matrix.

41. The system of claim 40, wherein each of the effective channel matrices comprises $$\begin{bmatrix} h_1 & h_2 \\ h_2^* & -h_1^* \end{bmatrix},$$

wherein $-h_1^*$ is a negative complex conjugate of $h_1$ and $h_2^*$ is a complex conjugate of $h_2$.

42. The system of claim 28, further comprising means for reducing phase rotation caused by a channel.

43. The system of claim 28, wherein the means for processing each of the multiple sets of signals comprises means for concatenating the signals within each set of signals into a single vector.

44. The system of claim 28, wherein the means for decoding comprises means for maximum-likelihood decoding.

45. The system of claim 28, further comprising means for preprocessing the channel information associated with each of the multiple sets of signals.

46. The system of claim 28, wherein the means for processing each of the signal vectors comprises means for computing the Frobenius norm of a corresponding one of the effective channel response matrices.

47. The system of claim 28, wherein the means for decoding comprises means for computing a Cholesky factorization of the combined effective channel matrix.

48. The system of claim 47, wherein the means for computing a Cholesky factorization produces a triangular matrix, L, and wherein the means for decoding further comprises means for calculating $\|L^{-1}\hat{y}_N - L^* x\|^2$, where $\hat{y}_N$ is the combined signal vector and x is a possible value of the common transmitted information.

49. The system of claim 28, wherein the multiple sets of signals are received within distinct time intervals, and wherein the means for combining the signal vectors comprises means for combining the signal vectors from the same time interval.

50. The system of claim 49, wherein the combined signal vector is a first combined signal vector corresponding to signals received in a first time interval, the system further comprising:
means for storing the first combined signal vector; and
means for combining signal vectors produced from signals received in a second time interval with the stored first combined signal vector to form a second combined signal vector.

51. The system of claim 50, further comprising means for storing the second combined signal vector by overwriting the first combined signal vector.

52. The system of claim 49, further comprising means for preprocessing channel information associated with signals received in the same time interval.

53. The system of claim 52, further comprising:
means for storing first preprocessed channel information corresponding to signals received in a first time interval; and
means for combining preprocessed channel information corresponding to signals received in a second time interval with the stored first preprocessed channel information to form second preprocessed channel information.

54. The system of claim 53, further comprising means for storing the second preprocessed channel information by overwriting the first preprocessed channel information.

55. A receiver for decoding a signal vector in a transmit diversity scheme, comprising:
one or more inputs for receiving multiple sets of signals corresponding to common transmitted information, wherein each of the multiple sets of signals is associated with its own channel information and comprises signals associated with different symbol periods;
processing circuitry for:
processing each of the multiple sets of signals and its associated channel information to produce a plurality of signal vectors and a plurality of effective channel matrices;
combining the signal vectors into a combined signal vector, wherein the combining comprises processing each of the signal vectors based on a corresponding one of the effective channel matrices; and
combining the effective channel matrices into a combined effective channel matrix; and
a decoder for decoding the combined signal vector using the combined effective channel matrix.

56. The receiver of claim 55, wherein the multiple sets of signals are received using a retransmission protocol.

57. The receiver of claim 56, wherein the retransmission protocol is a hybrid automatic repeat request (HARQ) protocol.

58. The receiver of claim 55, wherein a fixed number of signals are received.

59. The receiver of claim 58, wherein the fixed number of signals are received using repetition coding.

60. The receiver of claim 55, wherein symbols of the multiple sets of signals correspond to a signal constellation set.

61. The receiver of claim 60, wherein the signal constellation set is based on quadrature amplitude modulation.

62. The receiver of claim 55, wherein the multiple sets of signals comprise one of uncoded and coded data.

63. The receiver of claim 55, wherein the transmit diversity scheme is an Alamouti transmission scheme.

64. The receiver of claim 63, wherein the common transmitted information is received in two symbol periods, wherein $x_1$ and $x_2$ are transmitted from a first and a second output of a transmitter in a first symbol period, respectively, and wherein $-x_2^*$, a negative complex conjugate of $x_2$, and $x_1^*$, a complex conjugate of $x_1$, are transmitted from the first and second outputs of the transmitter in a second symbol period, respectively.

65. The receiver of claim 64, wherein each of the plurality of signal vectors is represented as $$y = \begin{bmatrix} y_1 \\ y_2^* \end{bmatrix},$$

where $y_1$ is received in the first symbol period and $y_2$ is received in the second symbol period, and wherein $y_2^*$ is a complex conjugate of $y_2$.

66. The receiver of claim 55, wherein the processing circuitry combines the signal vectors by adding the processed signal vectors.

67. The receiver of claim 66, wherein the processing circuitry is further configured to weight each signal vector according to a conjugate transpose of the corresponding effective channel matrix.

68. The receiver of claim 67, wherein each of the effective channel matrices comprises $$\begin{bmatrix} h_1 & h_2 \\ h_2^* & -h_1^* \end{bmatrix},$$

wherein $-h_1^*$ is a negative complex conjugate of $h_1$ and $h_2^*$ is a complex conjugate of $h_2$.

69. The receiver of claim 55, wherein the processing circuitry is further configured to reduce phase rotation caused by a channel.

70. The receiver of claim 55, wherein the processing circuitry concatenates the signals within each set of signals into a single vector.

71. The receiver of claim 55, wherein the decoder comprises a maximum-likelihood decoding.

72. The receiver of claim 55, further comprising a preprocessor for preprocessing the channel information associated with each of the multiple sets of signals.

73. The receiver of claim 55, wherein the processing circuitry computes, for each of the signal vectors, the Frobenius norm of a corresponding one of the effective channel response matrices.

74. The receiver of claim 55, wherein the decoder computes a Cholesky factorization of the combined effective channel matrix.

75. The receiver of claim 74, wherein the Cholesky factorization produces a triangular matrix, L, and wherein the decoder is further configure to calculate $\|L^{-1}\hat{y}_N - L^*x\|^2$, where $\hat{y}_N$ is the combined signal vector and x is a possible value of the common transmitted information.

76. The receiver of claim 55, wherein the multiple sets of signals are received within distinct time intervals, and wherein the processing circuitry combines signal vectors from the same time interval.

77. The receiver of claim 76, wherein the combined signal vector is a first combined signal vector corresponding to signals received in a first time interval, the receiver further comprising a storage for storing the first combined signal vector, and wherein the processing circuitry combines signal vectors produced from signals received in a second time interval with the stored first combined signal vector to form a second combined signal vector.

78. The receiver of claim 77, wherein the second combined signal vector is stored in the storage by overwriting the first combined signal vector.

79. The receiver of claim 76, further comprising a channel preprocessor for preprocessing channel information associated with signals received in the same time interval.

80. The receiver of claim 79, further comprising:
a storage for storing first preprocessed channel information corresponding to signals received in a first time interval; and
a channel combiner for combining preprocessed channel information corresponding to signals received in a second time interval with the stored first preprocessed channel information to form second preprocessed channel information.

81. The receiver of claim 80, wherein the second preprocessed channel information is stored in the storage by overwriting the first preprocessed channel information.

* * * * *